(12) United States Patent
Saitou et al.

(10) Patent No.: US 8,890,649 B2
(45) Date of Patent: Nov. 18, 2014

(54) BENDING SENSOR AND DEFORMED SHAPE MEASUREMENT METHOD

(75) Inventors: Yuuki Saitou, Komaki (JP); Masaru Murayama, Komaki (JP); Tomonori Hayakawa, Komaki (JP); Koichi Hasegawa, Komaki (JP); Tetsuyoshi Shibata, Komaki (JP)

(73) Assignee: Tokai Rubber Industries, Ltd, Aichi-ken (JP)

( * ) Notice: Subject to any disclaimer, the term of this patent is extended or adjusted under 35 U.S.C. 154(b) by 400 days.

(21) Appl. No.: 13/141,859

(22) PCT Filed: Sep. 16, 2010

(86) PCT No.: PCT/JP2010/066075
§ 371 (c)(1),
(2), (4) Date: Sep. 1, 2011

(87) PCT Pub. No.: WO2011/065100
PCT Pub. Date: Jun. 3, 2011

(65) Prior Publication Data
US 2011/0307214 A1    Dec. 15, 2011

(30) Foreign Application Priority Data

Nov. 24, 2009  (JP) .................... 2009-266097
Jul. 5, 2010   (JP) .................... 2010-152907
Jul. 28, 2010  (JP) .................... 2010-168868

(51) Int. Cl.
| | |
|---|---|
| *G01B 7/16* | (2006.01) |
| *G01M 5/00* | (2006.01) |
| *G01L 1/20* | (2006.01) |
| *H01C 10/10* | (2006.01) |
| *H01C 17/065* | (2006.01) |

(52) U.S. Cl.
CPC ............. *G01L 1/205* (2013.01); *G01M 5/0041* (2013.01); *H01C 17/06586* (2013.01); *G01B 7/18* (2013.01); *H01C 17/0652* (2013.01); *G01M 5/0083* (2013.01); *H01C 10/106* (2013.01)
USPC ............... 338/47; 702/155; 33/788; 73/774; 73/862.627; 252/511

(58) Field of Classification Search
USPC ............... 702/155; 33/788; 73/774, 862.627; 252/511; 338/47
See application file for complete search history.

(56) References Cited

U.S. PATENT DOCUMENTS 5,086,785 A    2/1992  Gentile et al.
5,583,476 A    12/1996 Langford
(Continued)

FOREIGN PATENT DOCUMENTS

JP    4-022829    1/1992
JP    6-050830    2/1994
(Continued)

OTHER PUBLICATIONS

Thermal Properties of Polymers—Polymer Glass Transition, available at https://web.archive.org/web/20080612091303/http://plc.cwru.edu/tutorial/enhanced/files/polymers/therm/therm.htm.*

(Continued)

*Primary Examiner* — Mohamed Charioui
*Assistant Examiner* — John Kuan
(74) *Attorney, Agent, or Firm* — Greenblum & Bernstein, P.L.C.

(57) ABSTRACT

Provided are a bending sensor that is less dependent on an input speed of a strain and in which a response delay is unlikely to occur, and a deformed shape measurement method using the bending sensor. The bending sensor is configured to include a base material; a sensor body arranged on a surface of the base material and containing a matrix resin and conductive filler particles filled in the matrix resin at a filling rate of 30% by volume or more, and in which three-dimensional conductive paths are formed by contact among the conductive filler particles, and electrical resistance increases as an deformation amount increases; an elastically deformable cover film arranged so as to cover the sensor body; and a plurality of electrodes connected to the sensor body and capable of outputting electrical resistances. In the sensor body, cracks are formed in advance in such a direction that the conductive paths are cut off during a bending deformation.

12 Claims, 20 Drawing Sheets

(56) References Cited

U.S. PATENT DOCUMENTS

| | | | | |
|---|---|---|---|---|
| 5,652,395 | A | * | 7/1997 | Hirano et al. .................. 73/849 |
| 7,248,142 | B2 | * | 7/2007 | Beck et al. .................... 338/211 |
| 7,472,587 | B1 | * | 1/2009 | Loehndorf et al. ............. 73/146 |
| 2004/0007859 | A1 | | 1/2004 | Shields et al. |
| 2008/0066564 | A1 | | 3/2008 | Hayakawa et al. |
| 2008/0067477 | A1 | * | 3/2008 | Hayakawa et al. ........... 252/511 |
| 2008/0100046 | A1 | * | 5/2008 | Hayakawa et al. ........... 280/735 |
| 2009/0120696 | A1 | * | 5/2009 | Hayakawa et al. ........ 178/18.05 |
| 2010/0049450 | A1 | * | 2/2010 | Nagakubo et al. ............. 702/41 |

FOREIGN PATENT DOCUMENTS

| | | |
|---|---|---|
| JP | 10-239194 | 9/1998 |
| JP | 2003-510216 | 3/2003 |
| JP | 2003-344185 | 12/2003 |
| JP | 2008-069313 | 3/2008 |
| JP | 2008-69313 | 3/2008 |
| JP | 2008-070327 | 3/2008 |
| JP | 2008-197060 | 8/2008 |
| JP | 2009-128245 | 6/2009 |
| JP | 2009-198483 | 9/2009 |
| WO | 01/24137 | 4/2001 |

OTHER PUBLICATIONS

China Office action, dated Aug. 3, 2012 along with an english translation thereof.
Japanese Office Action (JP Appl. No. 2010-152907), mail date is Oct. 29, 2013, along with partial English-language translation.
Japanese Office Action (JP Appl. No. 2010-168868), mail date is Oct. 29, 2013, along with partial English-language translation.

* cited by examiner

Fig. 23(a)
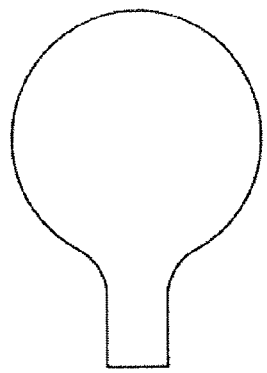
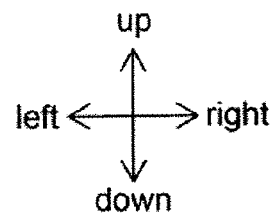
Fig. 23(b)
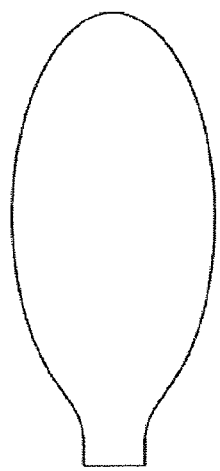
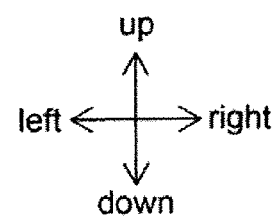
Fig. 23(c)
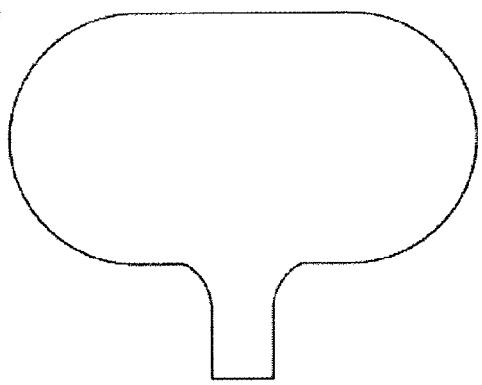
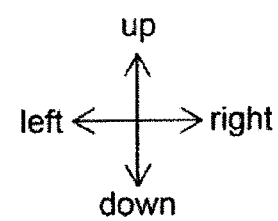

BENDING SENSOR AND DEFORMED SHAPE MEASUREMENT METHOD

TECHNICAL FIELD

The present invention relates to a bending sensor capable of detecting bending deformation of a measured object and a deformed shape measurement method using the bending sensor.

BACKGROUND ART

For example, as a means for detecting deformation of a member and a magnitude of a load acting on the member, a flexible sensor using an elastomer or a resin has been proposed. The sensor has a sensor body in which conductive filler particles are mixed in the elastomer or the resin. For example, in a sensor body disclosed in Patent Documents 1 and 2, spherical conductive filler particles are mixed at a high filling rate in an elastomer or a resin. Therefore, in the sensor body in a state in which a load is not applied (which may be referred to as a "no-load state" as appropriate in the following), 3-dimentional conductive paths are formed by contact among conductive filler particles. Therefore, the sensor body has a high electrical conductivity in the no-load state.

FIG. 17 includes schematic diagrams enlarging a portion of conductive filler particles in a sensor body. FIG. 17(a) illustrates a no-load state before a bending deformation; FIG. 17(b) illustrates a state immediately after the bending deformation; and FIG. 17(c) illustrates a state further after the state immediately after the bending deformation. As FIG. 17(a) illustrates, a sensor body 900 has a matrix resin 901 and conductive filler particles 902. In the sensor body 900, a conductive path P1 is formed by contact among the conductive filler particles 902. When a load is applied to the sensor body 900, the sensor body starts a bending deformation. As FIG. 17(b) illustrates, along with the start of the bending deformation, the matrix resin 901 is stretched in a left-right direction in the figure. This causes the conductive filler particles 902 to repel each other and the contact state of the conductive filler particles 902 to change. As FIG. 17(c) illustrates, when the sensor body 900 bends further, the matrix resin 901 is stretched further. This causes the contact among the conductive filler particles 902 to be broken and the conductive path P1 to be cut off. As a result, electrical resistance increases. When the applied load is removed, the sensor body 900 is restored to its original state (the state illustrated in FIG. 17(a)) by an elastic restoring force of the matrix resin 901. Thus, according to the sensor of Patent Documents 1 and 2, a deformation can be detected based on an increase in the electrical resistance of the sensor body.

RELATED ART

Patent Documents

Patent document 1: Japanese Patent Laid-Open Publication No. 2008-70327

Patent document 2: Japanese Patent Laid-Open Publication No. 2009-198483

Patent document 3: Japanese Patent Laid-Open Publication (Translation of PCT Application) No. 2003-510216

Patent document 4: U.S. Pat. No. 5,583,476

Patent document 5: U.S. Pat. No. 5,086,785

SUMMARY OF THE INVENTION

Problems to be Resolved by the Invention

As described in the above, according to the sensor body disclosed in Patent Documents 1 and 2, conductive paths collapse due to an elastic deformation of a parent material (an elastomer or a resin), and electrical resistance increases. That is, the sensor disclosed in Patent Documents 1 and 2 detects a deformation based on an increase in the electrical resistance in an elastic region of the parent material. However, it takes time from an input of a strain until the parent material elastically deforms. Therefore, in detection of a bending deformation in the elastic region of the parent material, a response is delayed by the time required for the elastic deformation of the parent material. Therefore, detection accuracy decreases. In particular, for a fast bending deformation, the response delay further increases and thus the detection accuracy is likely to further decrease. The speed of the elastic deformation of the parent material is influenced by an input speed of a strain and a temperature of an atmosphere. Therefore, the input speed of the strain and the temperature of the atmosphere also contribute to the decrease in the detection accuracy.

The present invention is devised in view of the problems as described above. A purpose of the present invention is to provide a bending sensor that is less dependent on an input speed of a strain and for which a response delay is unlikely to occur. Another purpose of the present invention is to provide a deformed shape measurement method capable of accurately measuring a shape of a measured object during a bending deformation by using the bending sensor.

Solutions to the Problems (1) A bending sensor according to the present invention includes a base material; a sensor body arranged on a surface of the base material and having a matrix resin and conductive filler particles filled in the matrix resin at a filling rate of 30% by volume or more, in which three-dimensional conductive paths are formed by contact among the conductive filler particles and an electrical resistance increases as an deformation amount increases; an elastically deformable cover film arranged in a manner covering the sensor body; and a plurality of electrodes connected to the sensor body and capable of outputting electrical resistances. In the sensor body, cracks are formed in advance along such a direction that the conductive paths are cut off during a bending deformation.

In the sensor body, which constitutes the bending sensor according to the present invention, the conductive filler particles are filled in the matrix resin at a filling rate of 30% by volume or more. Here, the filling rate of the conductive filler particles is a value when a volume of the sensor body is 100% by volume. Due to the high filling rate of the conductive filler particles, three-dimensional conductive paths are formed in the sensor body by contact among the conductive filler particles. That is, the sensor body has a high conductivity in a no-load state, and the electrical resistance increases as a magnitude of a deformation increases.

In addition, cracks are formed in advance in the sensor body. The cracks are formed along such a direction that the conductive paths are cut off during a bending deformation. FIG. 1 includes schematic diagrams enlarging a portion of a crack in the sensor body. However, FIG. 1 illustrates schematic diagrams for explaining the sensor body according to the present invention. FIG. 1, including, for example, a shape of a crack, an extension direction of a crack, a shape of a conductive filler particle. a shape of a conductive path, an extension direction of a conductive path, and the like, shown therein, are not to be considered as limiting in any way the present invention. FIG. 1(a) illustrates a no-load state before a bending deformation. FIG. 1(b) illustrates a state after a bending deformation.

As FIG. 1(a) illustrates, a sensor body 800 has a matrix resin 801, conductive filler particles 802, and a crack 803. In the sensor body 800, a conductive path P is formed by contact among the conductive filler particles 802. The crack 803 is formed along a direction crossing a left-right direction (extension direction) in the figure. When a load is applied to the sensor body 800, the sensor body 800 starts a bending deformation. When the sensor body 800 extends along the left-right direction due to the bending deformation, as FIG. 1(b) illustrates, the crack 803 opens up. This causes the contact among the conductive filler particles 802 to be broken, and the conductive path P to be cut off. As a result, the electrical resistance increases. When the applied load is removed, the sensor body 800 is restored to its original state (the state illustrated in FIG. 1(a)). This also restores the crack 803 to its original state.

In this way, in the sensor body of the bending sensor according to the present invention, when a strain is input due to a bending deformation, conductive paths are cut off without waiting for an elastic deformation of the matrix resin (however, the bending sensor according to the present invention does not exclude a case where conductive paths are cut off due to an elastic deformation of the matrix resin). Therefore, a response delay is unlikely to occur.

Further, the conductive paths are cut off mainly due to opening up of the cracks. Therefore, as compared to the case where the conductive paths are cut off depending only on an elastic deformation of the matrix resin (see FIG. 17 mentioned earlier), a small strain can also be accurately detected.

Further, as described earlier, the speed of an elastic deformation of the matrix resin is influenced by a temperature of an atmosphere. With respect to this point, the conductive paths in the bending sensor according to the present invention are cut off primarily due to opening up of the cracks. Therefore, as compared to the case where the conductive paths are cut off depending only on an elastic deformation of the matrix resin (see FIG. 17 mentioned earlier), the response speed is less dependent on the temperature of the atmosphere. As is clear from embodiments to be described later, the response speed is also less dependent on the input speed of a strain.

Further, the sensor body is covered by the cover film. This inhibits deterioration of the sensor body. Here, the cover film is elastically deformable. Therefore, when a load is removed after a bending deformation, with the help of the elastic restoring force of the cover film, the sensor body is easily restored to its original shape. Further, the cracks, which have been opened up, are also easily restored to their original states.

Further, the sensor body is arranged on a surface of the base material. By adjusting the thickness of the base material, the sensitivity of the bending sensor can be adjusted. For example, in a case where the center of curvature during a bending deformation is on a rear side of the base material, when the thickness of the base material is increased, a strain amount of the sensor body during the bending deformation increases. That is, when a total thickness of the base material and the sensor body is denoted by t, and a radius of curvature extending from the center of curvature to the rear surface of the base material is denoted by R, the strain amount $\epsilon$ is given by $\epsilon = t/R$. Therefore, when the thickness of the base material is increased, the strain amount of the sensor body during a bending deformation increases. This enhances the sensitivity of the bending sensor.

Conductive inks, in which electrical resistance increases due to opening or closing up of cracks, are disclosed in the above mentioned Patent Documents 3-5. However, in all of the conductive inks, the cracks occur during a bending deformation. In other words, the cracks are not formed before the use of the conductive inks. With respect to this point, the disclosed conductive inks are different from the sensor body according to the present invention. That is, when new cracks are formed during a bending deformation, the sensitivity of the bending sensor changes. Therefore, in the present invention, cracks are formed in advance during production of the sensor body, which inhibits formation of new cracks during a bending deformation.

(2) It is desirable that, in the configuration according to the above described aspect (1), the conductive filler particles have an average particle size of 0.05 μm or more and 100 μm or less.

When the particle size of the conductive filler particles is small, a reinforcement effect for the matrix resin increases. Therefore, cracks are unlikely to form. Further, a fracture strain of the sensor body (the strain when cracks occur in the sensor body) increases. Therefore, an increase in electrical resistance is more likely dependent on the elastic deformation of the sensor body than opening up of the cracks. Further, when producing the sensor body, a sensor material containing a matrix resin and conductive filler particles is difficult to be made as paint. From such a point of view, it is desirable that the conductive filler particles have an average particle size of 0.05 μm or more. By doing so, cracks are easily formed along interfaces of the conductive filler particles. Further, the cracks are likely to open up at the interfaces of the conductive filler particles, thereby reducing the fracture strain of the sensor body. It is desirable that the conductive filler particles have an average particle size of preferably 0.5 μm or more, and even more preferably 1 μm or more.

On the other hand, when the average particle size of the conductive filler particles is above 100 μm, the number of conductive paths decreases in a no-load state, and the contact state between the conductive filler particles is unlikely to change with respect to a bending deformation, and changing in electrical resistance becomes slow. Further, it is hard to reduce the thickness of the sensor body. It is desirable that the conductive filler particles have an average particle size of preferably 30 μm or less, and even more preferably 10 μm or less. As the average particle size, a particle size (D50), at which an accumulation weight becomes 50% on a cumulative particle size curve of the conductive filler particles, is adopted.

(3) It is desirable that, in the configuration according to the above described aspect (1), the conductive filler particles be spherical carbon particles.

By making the conductive filler particles spherical, the conductive filler particles can be mixed in the matrix resin in a state close to densest packing. This allows three-dimensional conductive paths to be easily formed and a desired conductivity to be easily achieved. Further, with respect to an elastic deformation of the sensor body, the contact state of the conductive filler particles changes easily. Therefore, a change in the electrical resistance is large. Further, it is desirable that the spherical carbon particles have fewer surface functional groups. When there are fewer surface functional groups, fractures are likely to occur at interfaces with the matrix resin, allowing cracks to form easily in the sensor body.

(4) It is desirable that, in the configuration according to the above described aspect (1), when a plurality of unit sections each having a length of 2 mm or less are partitioned in series in the sensor body in a direction along which the electrodes are arranged, at least one of the cracks be formed in each of the unit sections.

The sensitivity of the bending sensor varies depending on a density of the cracks formed in the sensor body (the number of cracks per unit length along the arrangement direction of the electrodes). The length of each of the unit sections is made 2 mm or less because, when it is more than 2 mm, the density of the cracks decreases and the sensitivity of the bending sensor decreases. In other words, it is because a desired sensitivity is unlikely to be realized. It is even more desirable that the length of each of the unit sections is set to 1 mm or less. This further enhances the sensitivity of the bending sensor.

(5) It is desirable that, in the configuration according to the above described aspect (1), a strain be input in advance in the sensor body.

When the sensor body bends, an elastic region appears at an initial stage of the bending deformation, and a region beyond the fracture strain appears at a later stage. The sensor disclosed in Patent Documents 1 and 2 mentioned earlier uses only the elastic region to detect the deformation.

FIG. 2 illustrates a schematic graph showing a relation between a strain amount of a sensor body and electrical resistance. However, FIG. 2 is not to be considered as limiting in any way the present configuration. As FIG. 2 illustrates, as the sensor body bends, the strain amount increases. As the strain amount increases, the electrical resistance also increases.

Here, as an arrow Y1 indicates in the figure, in the initial stage of a bending deformation, the electrical resistance increases nearly quadratically with respect to the strain amount. Therefore, as a point X1 indicates in the figure, responsiveness of the electrical resistance with respect to the strain amount in the initial stage of the bending deformation is low. The region indicated by the arrow Y1 is estimated to be the elastic region of the bending sensor.

Further, as an arrow Y2 indicates in the figure, in a stage after the initial stage of the bending deformation, the electrical resistance increases nearly linearly with respect to the strain amount. Further, as a point X2 indicates in the figure, the responsiveness of the electrical resistance with respect to the strain amount is high as compared to the point X1. The region indicated by the arrow Y2 is estimated to be the region above the fracture strain, beyond the elastic region of the sensor body.

Therefore, as compared to the case where the elastic region of the sensor body is used alone as the bending deformation detection region, in the case where the region beyond the fracture strain of the sensor body is used (including the case where the region beyond the fracture strain is used alone and the case where the elastic region and the region beyond the fracture strain are used in combination), the change in the electrical resistance is larger for the same amount of input strain. Therefore, the sensitivity of the sensor is enhanced. Further, the electrical resistance rises nearly linearly with respect to the strain amount. Therefore, the strain amount can be easily calculated from the electrical resistance.

With respect to this point, according to the present configuration, a strain is input in advance in the sensor body. Therefore, the total strain amount of the sensor body during a bending deformation is a sum of the strain amount input in advance and the strain amount associated with the bending deformation. That is, the total strain amount of the sensor body is increased as compared to the case where there is only the strain amount associated with the bending deformation.

This allows the region beyond the fracture strain of the sensor body to be easily used as a detection region. That is, the detection region can be easily shifted toward a region where the relation between the strain amount and the electrical resistance is linear (strain offset). Therefore, according to the present configuration, the sensitivity of the bending sensor is enhanced. Further, the strain amount, and thus the shape and the like of the sensor body during a bending deformation, can be easily calculated from the electrical resistance.

(6) It is desirable that, in the configuration according to the above described aspect (1), the electrodes are formed by printing a conductive paint on the base material.

For example, the bending sensor according to the present invention can be configured by arranging the sensor body on a surface of a flexible printed circuit board (FPC) and the like. A conduction pattern on the FPC is formed by etching a metal foil. By the etching of the metal foil, the electrodes and the wirings can be formed with thin lines and at a narrow pitch. Therefore, by using the FPC, the bending sensor according to the present invention can be downsized.

However, when electrodes are formed by etching a metal foil, edge portions of the electrodes are likely to become angular. Therefore, in the case where cracks are formed by restoring the sensor body to its original state after being bent and hardened, a stress is likely to concentrate on the edge portions of the pre-formed electrodes. Thus, cracks are likely to be formed concentrated around the electrodes. That is, fluctuation is likely to occur in the distribution of the cracks in the sensor body. FIG. 18 illustrates a partial cross-sectional schematic diagram of a sensor body during crack formation in the case where the electrodes are formed by etching.

As FIG. 18 illustrates, a sensor body 810 is arranged on a surface of a base material 811. Between the sensor body 810 and the base material 811, electrodes 812a-812c are interposed at predetermined intervals. The electrodes 812a-812c are formed by etching a metal foil. Angular portions 813 are formed at edge portions of the electrodes 812a-812c in an extending direction of the sensor body 810. A stress is likely to be concentrated on the angular portions 813. Therefore, cracks 814 are formed concentrated around the electrodes 812a-812c.

As just described, when there is fluctuation in the distribution of the cracks, differences in sensor response occur between respective measurement sections partitioned by the electrodes. Further, the electrodes, which are made from a metal foil, do not have sufficient adhesion with the sensor body, which uses a resin as a binder. This point is also a factor causing the cracks to be concentrated around the electrodes.

According to the present configuration, the electrodes are formed by printing the conductive paint on the base material. Edge portions of the electrodes formed by the printing of the conductive paint are unlikely to become angular. Therefore, during the formation of the cracks in the sensor body, a stress is unlikely to be concentrated on the edge portions of the electrodes. Further, the conductive paint uses a resin or an elastomer as a binder. Therefore, the electrodes formed from the conductive paint have good adhesion with the sensor body. Therefore, according to the present configuration, the cracks can be formed nearly uniformly over the entire sensor body. This allows a stable sensor response to be obtained independent of the measurement sections. FIG. 19 illustrates a partial cross sectional schematic diagram of a sensor body during crack formation in the case where the electrodes are formed by printing.

As FIG. 19 illustrates, a sensor body 810 is arranged on a surface of a base material 811. Between the sensor body 810 and the base material 811, electrodes 812a-812c are interposed at predetermined intervals. The electrodes 812a-812c are formed by printing a conductive paint. Edge portions of the electrodes 812a-812c in an extending direction of the sensor body 810 have curved chamfered portions 815. A stress is unlikely to be concentrated on the chamfered portions 815. Therefore, cracks 814 are nearly uniformly formed over the entire sensor body 810.

(6-1) In the configuration of the above described aspect (6), it is desirable that the conductive paint be configured to have a binder and a conductive material, the binder being made from a resin or an elastomer. As the conductive material, for example, a powder of a metal such as silver, gold, copper, and nickel, a conductive carbon powder, coated particles having surfaces covered with a metal, and the like may be used.

(7) It is desirable that, in the configuration according to the above described aspect (6), the electrodes have such a surface shape that an edge line in a direction along which the sensor body extends has a curved portion.

According to the present configuration, when the cracks are formed by restoring the sensor body to its original state after being bent and hardened, a stress is unlikely to be concentrated around the edge portions of the electrodes interposed between the base material and the sensor body. Therefore, the cracks can be more uniformly formed in the sensor body.

(8) It is desirable that the configuration according to the above described aspect (1) further include wirings respectively connected to the electrodes, the wirings being formed by etching a metal foil.

As will be explained later with respect to an aspect (15) of the present invention, when the bending sensor of the present invention is used to measure a deformed shape of a measured object, it is desirable that a large number of the electrodes are used, and the measurement sections are more finely partitioned. In this case, the number of wirings respectively connected to the electrodes also increases. According to the present configuration, a wiring pattern can be formed with thin lines and at a narrow pitch. Therefore, the present configuration can be preferably used for downsizing the bending sensor.

(9) It is desirable that the configuration according to the above described aspect (1) further include a strain adjustment plate provided on the rear surface of the base material; and an adhesion layer bonding the strain adjustment plate and the base material, and that the base material, the strain adjustment plate, and the adhesion layer are all made from materials having a glass-rubber transition region, in which a storage elastic modulus transitions, on a lower temperature side than a lower temperature limit of an operating temperature range of the bending sensor minus 10° C., or on a higher temperature side than an upper limit of the operating temperature range of the bending sensor plus 10° C.

As explained with respect to the configuration of the aspect (1) mentioned earlier, when the thickness of the base material is increased, the strain amount of the sensor body during a bending deformation increases ($\epsilon=t/R$). According to the present configuration, by arranging the strain adjustment plate on the rear surface of the base material, an effect same as that achieved by increasing the thickness of the base material can be obtained. That is, when the strain adjustment plate is laminated on the base material, a strain due to a bending deformation is magnified. This enhances the sensitivity of the bending sensor. Further, by adjusting the thickness of the strain adjustment plate, sensor response can be optimized.

The strain adjustment plate is pasted to the base material via the adhesion layer. For example, when the adhesion layer is too soft as compared to the strain adjustment plate, a bending deformation to be transmitted via the strain adjustment plate is relaxed by the adhesion layer. This causes the bending deformation to be unlikely to be accurately and promptly transmitted to the sensor body. As a result, detection accuracy of the bending deformation decreases, and a response delay occurs.

According to the present configuration, the base material, the strain adjustment plate, and the adhesion layer are all made from materials having a glass-rubber transition region, in which a storage elastic modulus transitions, on a lower temperature side than a lower temperature limit of an operating temperature range of the bending sensor minus 10° C., or on a higher temperature side than an upper limit of the operating temperature range of the bending sensor plus 10° C. In the following, the glass-rubber transition region is explained. FIG. 20 illustrates an example of variation of storage elastic modulus with respect to temperature.

As FIG. 20 illustrates, storage elastic modulus of a polymer material such as a resin changes rapidly in certain temperature range. The polymer material is in a glass state in a region (A) where the storage elastic modulus is large, and is in a rubber state in a region (B) where the storage elastic modulus is small. That is, along with the rising of the temperature, the polymer material changes from a glass state to a rubber state. When the temperature is raised, a temperature, at which the storage elastic modulus graph begins to deviate from an extrapolation line a of the storage elastic modulus in the region (A), is referred to as T1. As the temperature is further raised, a temperature, at which the storage elastic modulus graph begins to match an extrapolation line b of the storage elastic modulus in the region (B), is referred to as T2. A temperature range from T1 to T2 (shown by hatching in the figure) is defined as a glass-rubber transition region.

In the present specification, as the storage elastic modulus, a value measured by using the following measurement method, according to JIS K7244-1 (1998) and JIS K7244-4 (1999), is adopted. That is, first, a reed-shaped test specimen was prepared having a width of 5 mm, a length of 20 mm, and a thickness of 1 mm. Next, by using a dynamic viscoelasticity measuring device ("Rheogel-E4000F" manufactured by UBM), a storage elastic modulus was measured for a temperature range of –70 to 120° C. The measurement was performed in a tension mode, at a temperature rising speed of 3° C./minute and a frequency of 1 Hz.

For example, an operating temperature range of the bending sensor is set to 20 to 25° C. In this case, the base material, the strain adjustment plate, and the adhesion layer are all made from materials having a glass-rubber transition region on a lower temperature side than the lower temperature limit minus 10° C., that is, 10° C., or on a higher temperature side than the upper temperature limit plus 10° C., that is, 35° C. When the operating temperature of the bending sensor is, for example, 20° C., instead of an operating temperature range, a range of ±10° C. relative to the temperature 20° C. may be set. According to the present configuration, in the operating temperature range of the bending sensor, the base material, the strain adjustment plate, and the adhesion layer have a uniform hardness state. Further, in the operating temperature range of the bending sensor, a state change, such as a change from a glass state to a rubber state or from a rubber state to a glass state, does not occur. For example, a case where a bending deformation occurs at a high speed shows the same behavior as a case where the operating temperature range shifts to a lower temperature side. However, according to the present configuration, the temperature range is set to have a margin of ±10° C. from the lower limit and the upper limit of the operating temperature. Therefore, even in the case where a bending deformation occurs with a high speed, the glass-rubber transition region will not be contained in the operating temperature region.

As just described, according to the present configuration, for members such as the base material that are arranged on a load input side, a bending deformation is unlikely to be relaxed. That is, a bending deformation is accurately transmitted to the sensor body. Therefore, according to the present configuration, degradation of detection accuracy of a bending deformation can be inhibited.

In particular, when materials having a glass-rubber transition region on a higher temperature side than the upper temperature limit of the operating temperature range of the bending sensor plus 10° C. are adopted, the base material, the strain adjustment plate, and the adhesion layer all can be formed with rigid materials in a glass state. This allows a bending deformation to be promptly transmitted to the sensor body. Thus, a response delay is unlikely to occur.

(10) It is desirable that, in the configuration according to the above described aspect (1), between two of the electrodes, the sensor body have a plurality of detection sections lined up in a perpendicular direction, each of the detection sections extending in a juxtaposing direction, the juxtaposing direction being a direction along which the two electrodes line up, and the perpendicular direction being a direction perpendicular to the juxtaposing direction.

The sensor body according to the present configuration has a plurality of detection sections. The detection sections each extend in the juxtaposing direction. The detection sections mutually line up in the perpendicular direction. Therefore, according to the bending sensor of the present invention, as compared to a bending sensor having a single detection section between two electrodes, when the total area of the detection sections is the same, fluctuation in electrical resistance can be reduced.

(11) It is desirable that, in the configuration according to the above described aspect (10), between neighboring two of the electrodes, the detection sections are mutually electrically connected in parallel.

In the case of a parallel connection, when the electrical resistances of the detection sections (1, 2, ..., n) are respectively denoted by R1, R2, ..., Rn, and the total electrical resistance is denoted by R, the relation 1/R=1/R1+1/R2+ ... +1/Rn holds. Therefore, even when fluctuation in electrical resistance occurs in any one of the detection sections, fluctuation in the sensor body as a whole can be relaxed. Therefore, fluctuation in the total electrical resistance R can be reduced. Further, according to the present configuration, the detection sections are connected in parallel. Therefore, even when the number of the arranged detection sections is increased, the total electrical resistance R is hard to increase.

(12) It is desirable that, in the configuration according to the above described aspect (10), between neighboring two of the electrodes, the detection sections be mutually electrically connected in series.

In the case of a serial connection, when the electrical resistances of the detection sections (1, 2, ..., n) are denoted by R1, R2, ..., Rn, and the total electrical resistance is denoted by R, the relation R=R1+R2+ ... +Rn holds. Therefore, even when fluctuation in electrical resistance occurs in any one of the detection sections, fluctuation in the sensor body as a whole can be relaxed. Therefore, fluctuation in the total electrical resistance R can be reduced. Further, according to the present configuration, the detection sections are connected in series in a manner similar to a one-stroke drawing. Therefore, even when the number of the arranged detection sections is increased, there is no need to change configuration of the connection portions of the sensor body and the electrodes.

(13) It is desirable that, in the configuration according to the above described aspect (10), the cracks be formed by deforming a precursor of the sensor body along a mold surface of a mold for crack formation. Here, the "precursor of the sensor body" refers to an object that will become the sensor body after being processed. For example, it refers to a coated film in the case where a sensor body is formed by using a printing method.

Fluctuation in the electrical resistance depends on the density of the cracks. That is, the larger the density of the cracks, the more stable the deformation trajectory of the bending sensor will be. Therefore, fluctuation in the electrical resistance decreases. Further, the sensitivity of the bending sensor also depends on the density of the cracks. That is, the larger the density of the cracks, the more the sensitivity of the bending sensor will be enhanced.

According to the present configuration, the cracks are formed by deforming the sensor body along the mold surface of the mold for crack formation. FIG. 27 illustrates a cross sectional view of a detection section before crack formation. FIG. 28 illustrates a cross sectional view of the detection section after the crack formation. However, FIGS. 27 and 28 are schematic diagrams for explaining the bending sensor according to the present configuration. FIGS. 27 and 28 are not to be considered as limiting in any way the present configuration, including, for example, the detection section, the shape of a base material, the shape of a mold for crack formation, the shape of a mold surface, and the like, shown therein.

As FIG. 27 illustrates, a detection section 21 is laminated on top of a base material 22. Both the detection section 21 and the base material 22 have a shape of a flat plate extending in a left-right direction. As FIG. 28 illustrates, a mold surface (outer surface) 230 of a mold 23 for crack formation has a shape of a curved surface bulged upward. By pressing a lower surface 220 of the base material 22 against the mold surface 230, cracks are formed in the detection section 21.

Here, by denoting a distance between neighboring cracks as L, a thickness of the detection section as d, a width of the detection section in a perpendicular direction as b, and a compressive fracture stress of the detection section as $\sigma Eb$, surface pressure P (the surface pressure when the lower surface 220 is pressed against the mold surface 230) can be expressed by the following Formula (I).

[Formula 1]

$$P = \frac{4db\sigma Eb}{3L^2} \qquad \text{Formula (I)}$$

When the surface pressure P is more than the compressive fracture stress $\sigma Eb$, compressive fracture occurs before cracks are formed. Therefore, the surface pressure $P \leq$ the compressive fracture stress $\sigma Eb$. In order to increase the density of the cracks, it is necessary to reduce as much as possible the distance L between neighboring cracks. In order to minimize the distance L, it is necessary to press the base material 22 against the mold surface 230 with as large the surface pressure P as possible, within a range not exceeding the compressive fracture stress $\sigma Eb$. By substituting P with a maximum value $P_{max} = \sigma Eb$ in the Formula (I), a minimum value $L_{min}$ of the distance L can be expressed by the following Formula (II).

[Formula 2]

$$L_{min} = \sqrt{\frac{4db}{3}}$$ Formula (II)

From the Formula (II), it is clear that the minimum value $L_{min}$ of the distance L is determined by the thickness d of the detection section 21 and the width b of the detection section in the perpendicular direction.

Thus, methods for increasing the density of the cracks include (A) reducing the thickness of the detection section 21; and (B) reducing the width of the detection section 21 in the perpendicular direction. Further, the methods include (C) reducing the radius of curvature of the mold surface 230 of the mold 23 for crack formation; and (D) reducing the thickness of the base material 22.

With respect to this point, according to the bending sensor of the present configuration, the sensor body includes a plurality of detection sections. The detection sections each extend in the juxtaposing direction. The detection sections mutually line up in the perpendicular direction. Therefore, according to the present configuration, as compared to a bending sensor having a single detection section, when the total area of the detection sections is the same, the width of a detection section in the perpendicular direction can be reduced (this corresponds to the above described method (B)). Therefore, the density of the cracks can be increased. That is, fluctuation in the electrical resistance can be reduced, and the sensitivity of the bending sensor can be improved.

(14) It is desirable that, in the configuration according to the above described aspect (10), 5 or more of the detection sections be arranged.

As it is clear also from embodiments to be described later, when 5 or more of the detection sections are arranged, as compared to a bending sensor having a single detection section, variation coefficient (=Standard Deviation/Average Value) of the electrical resistance can be lowered to ½ or less. When 10 or more of the detection sections are arranged, as compared to a bending sensor having a single detection section, the variation coefficient of the electrical resistance can be lowered to ⅓ or less. Further, when 20 or more of the detection sections are arranged, as compared to a bending sensor having a single detection section, the variation coefficient of the electrical resistance can be lowered to ¼ or less.

(15) A deformed shape measurement method according to the present invention includes a detection process detecting a bending deformation of the bending sensor according to any one of the above described aspects (1)-(14) for each of measurement sections partitioned by the electrodes; a partial shape calculation process calculating deformed shapes of the measurement sections based on detected deformation data of the measurement sections; and an entire shape calculation process calculating an entire deformed shape of the bending sensor by joining together the calculated deformed shapes of the measurement sections.

In the deformed shape measurement method of the present invention, the bending sensor is partitioned into a plurality of measurement sections. The deformed shape of the entire bending sensor, that is, the deformed shape of the measured object, is measured by joining together the deformed shapes of the measurement sections. According to the deformed shape measurement method of the present invention, by using the bending sensor of the present invention, a deformed shape of a measured object can be easily and dynamically measured. Further, when the number of arranged electrodes is increased, the measurement sections can be more finely partitioned. This allows the bending sensor, that is, the measured object to be more finely partitioned and the shapes of the sections be respectively measured. As a result, the deformed shape of the bending sensor, that is, the measured object, can be accurately calculated.

BRIEF DESCRIPTION OF THE DRAWINGS

FIG. 23 is a front view illustrating examples of a surface shape of an electrode;

DESCRIPTION OF THE REFERENCE NUMERALS

1: bending sensor; 10: base material; 11: sensor body; 12a-12i: electrodes; 13a-13i: wirings; 14: cover film; 15: connector; 16: strain adjustment plate;
17: adhesion layer;
100: front surface; 110: coated film; 120a, 120b: curved portions;
20: mold; 200: inner peripheral surface; 21: detection section; 22: base material; 23: mold for crack formation;
220: lower surface; 230: mold surface;
3: bending sensor; 30-34: sensor bodies;
5: collision experiment equipment; 50: striker; 51: elastic body; 52: insulation sheet;
6: bending sensor; 60: base material; 61: sensor body; 63a and 63b: electrodes; 64: cover film;
7: bending sensor; 70: base material; 71: sensor body; 72a and 72b: electrodes; 73a and 73b: wirings;
74: connector; 75: cover film; 710-714: detection sections;
800: sensor body; 801: matrix resin; 802: conductive filler particles; 803: crack;
810: sensor body; 811: base material; 812a-812c: electrodes; 813: angular portions; 814: cracks; 815: chamfered portions;
90: bumper cover; 90a: rear surface; 91: measured object; 910: outer curved surface;

C1: cracks; L1-L8: measurement sections; O: colliding object; P: conductive path; U1: unit section;
a-i: end points.

DESCRIPTION OF THE EMBODIMENTS

In the following, embodiments of a bending sensor and a deformed shape measurement method according to the present invention are explained.

First Embodiment

[Configuration of Bending Sensor]

Figure 3:
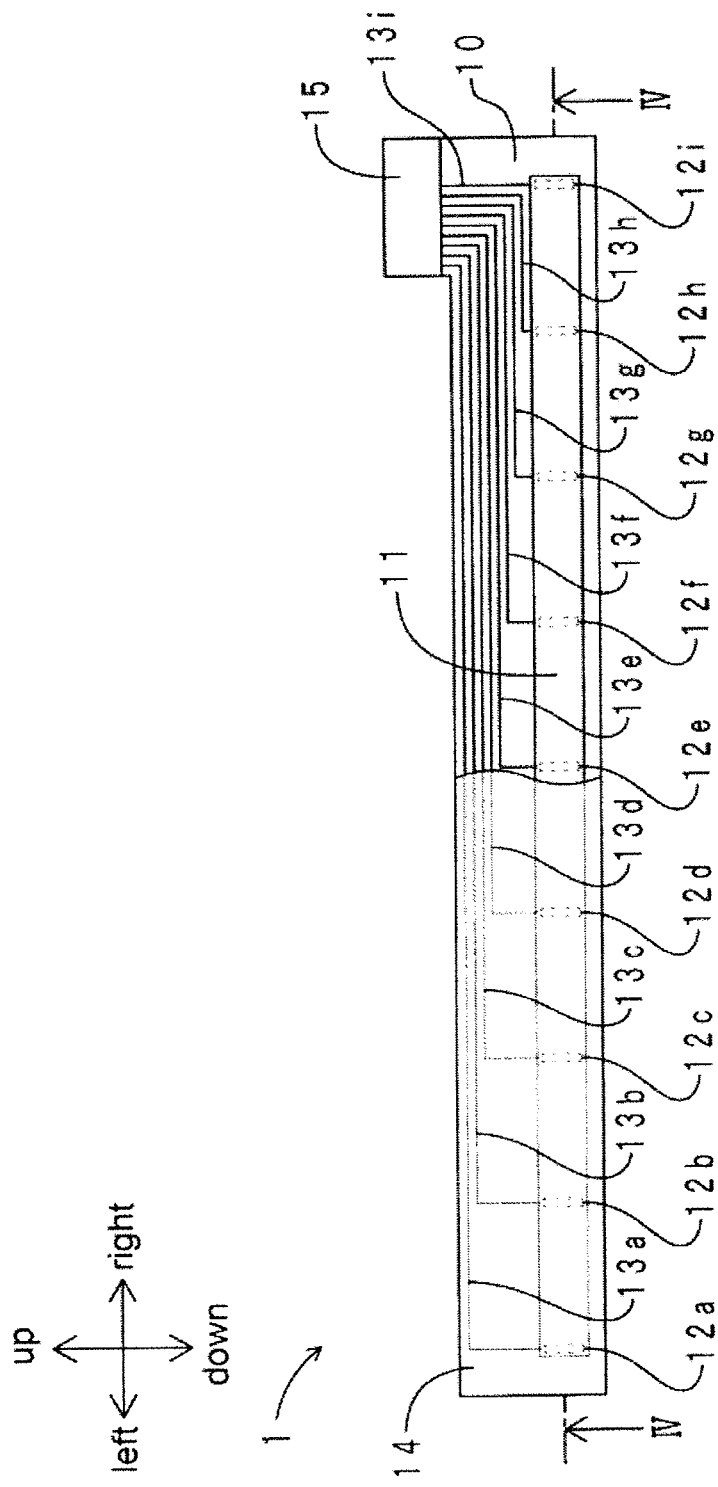
FIG. 3 is a front view of a bending sensor according to a first embodiment.
Figure 4:
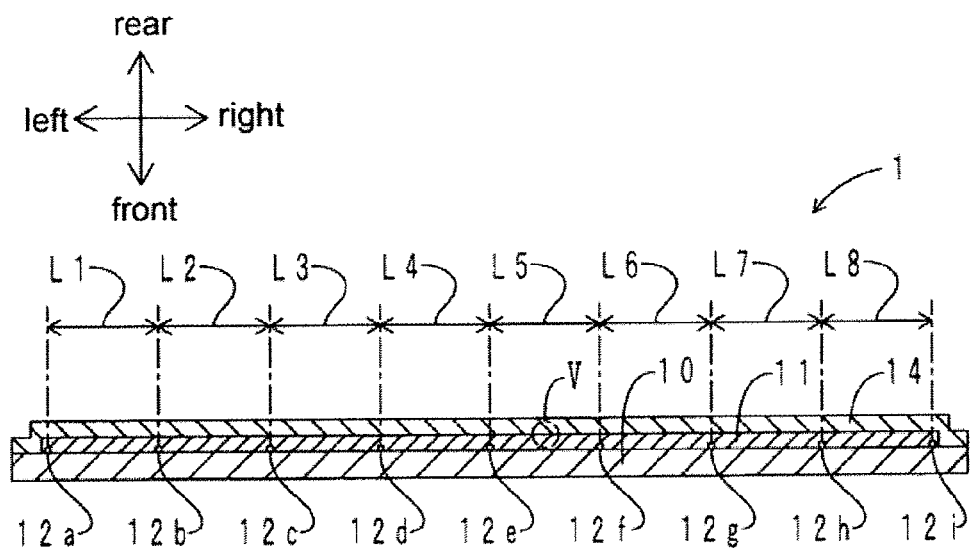
FIG. 4 is a cross sectional view taken along a line IV-IV shown in FIG. 3.
Figure 5:
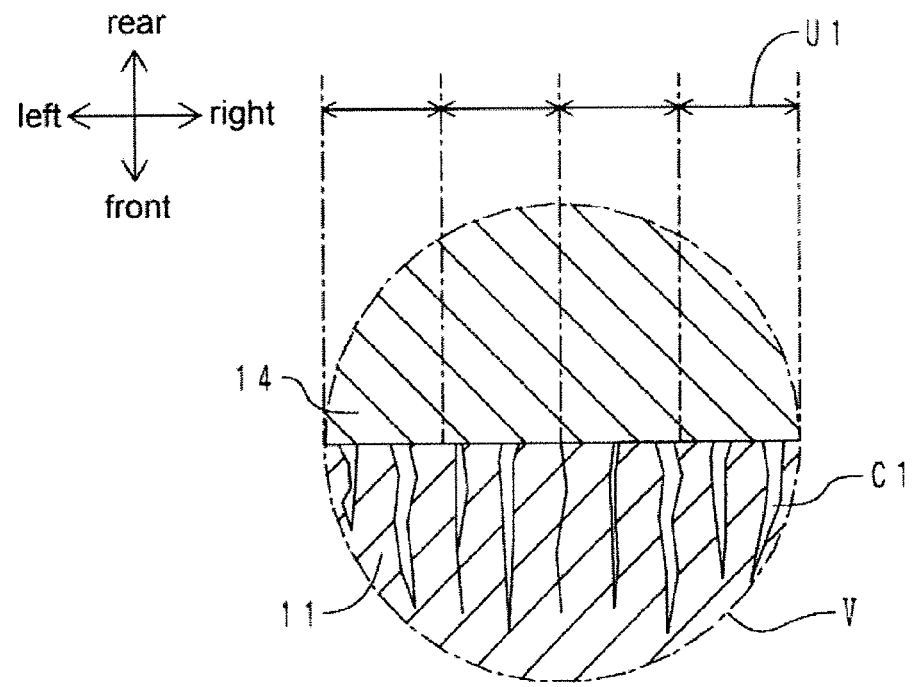
FIG. 5 is an enlarged view of an area within a circle V shown in FIG. 4.

First, a configuration of a bending sensor according to the present embodiment is explained. FIG. 3 illustrates a front view of the bending sensor. FIG. 4 illustrates a cross sectional view taken along a line IV-IV shown in FIG. 3. FIG. 5 illustrates an enlarged view of an area within a circle V shown in FIG. 4. For convenience of explanation, a right half of a cover film is removed from the illustration shown in FIG. 3. As FIGS. 3 and 4 illustrate, a bending sensor 1 has a base material 10, a sensor body 11, electrodes 12a-12i, wirings 13a-13i, and a cover film 14.

The base material 10 is made of a polyimide, and has a belt-like shape extending in a left-right direction. The base material 10 has a thickness of about 300 μm. At a right end of the base material 10, a connector 15 is arranged.

The sensor body 11 has a belt-like shape extending in the left-right direction. The sensor body 11 has a thickness of about 100 μm. The sensor body 11 is fixed on a surface (rear surface) of the base material 10. A strain has been input in advance in the sensor body 11.

The sensor body 11 is made from an epoxy resin (matrix resin) and carbon beads (conductive filler particles) mixed in the epoxy resin. A filling rate of the carbon beads is about 45% by volume when a volume of the sensor body 11 is 100% by volume. As FIG. 5 schematically illustrates, numerous cracks C1 have been formed in advance in the sensor body 11. The cracks C1 are arranged in a direction crossing an arrangement direction (the left-right direction) of the electrodes 12a-12i, that is, in a thickness-wise direction (the front-rear direction) of the sensor body 11. About two of the cracks C1 are formed in each unit section U1 having a length of 2 mm along the left-right direction of the sensor body 11.

The electrodes 12a-12i are arranged in a manner dividing the sensor body 11 into eight divisions along the left-right direction. The electrodes 12a-12i each have a reed-like shape extending in an up-down direction. The electrodes 12a-12i each are interposed between the sensor body 11 and the base material 10. Measurement sections L1-L8 each are partitioned by a pair of neighboring electrodes (such as the electrode 12a and the electrode 12b). The electrodes 12a-12i are respectively connected by the wirings 13a-13i to the connector 15.

The cover film 14 is made of an acryl rubber, and has a belt-like shape extending in the left-right direction. The cover film 14 covers the base material 10, the sensor body 11, and the wirings 13a-13i from a rear side.

[Bending Sensor Production Method]

Next, a production method of the bending sensor 1 according to the present embodiment is explained. The production method of the bending sensor 1 according to the present embodiment includes a paint preparation process, a printing process, a bending-hardening process, a load-removal process, and a cover film printing process.

In the paint preparation process, a sensor paint, an electrode paint, a wiring paint, a connector paint, and a cover film paint are each prepared. That is, the sensor paint is prepared by mixing, using a blade stirrer, 100 mass parts of an uncured resin of an epoxy resin ("Pelnox (registered trademark) ME-562", in liquid form, manufactured by Nippon Pelnox Corporation), 150 mass parts of a curing agent ("Pelcure (registered trademark) HV-562", in liquid form, manufactured by Nippon Pelnox Corporation), and 300 mass parts of carbon beads ("NICABEADS (registered trademark) ICB0520", having an average particle size of about 5 μm, manufactured by Nippon Carbon Co., Ltd.). For the electrode paint, the wiring paint, and the connector paint, "Dotite (registered trademark) FA-312" manufactured by FUJIKURA KASEI Co., Ltd. are used. Here, the electrode paint is included in a conductive paint of the present invention. The cover paint is prepared as follows. First, 100 mass parts of an acryl rubber polymer ("Nipol (registered trademark) AR51" manufactured by Nippon Zeon Co., Ltd.), 1 mass part of stearic acid of a vulcanizing aid ("LUNAC (registered trademark) S30" manufactured by Kao Corporation), 2.5 mass parts of zinc dimethyl dithiocarbamate as a vulcanization accelerator ("NOCCELER (registered trademark) PZ" manufactured by Ouchi Shinko Chemical Industrial Co., Ltd.), and 0.5 mass parts of ferric dimethyl dithiocarbamate ("NOCCELER TTFE" manufactured by Ouchi Shinko Chemical Industrial Co., Ltd.) are mixed using a roll mixing machine to prepare an elastomer composition. Next, the prepared elastomer composition is dissolved in 312 mass parts of an ethylene glycol monobutyl ether acetate, which is a solvent for printing.

In the printing process, the paints, except the cover film paint, are printed on a surface of the base material 10 using a screen printer. First, on the surface of the base material 10, the electrode paint, the wiring paint, and the connector paint are printed in order. Next, the base material 10 after the paint printing is placed in a drying furnace at a temperature of about 140° C. for about 30 minutes to harden the coated films. In this way, the electrodes 12a-12i, the wirings 13a-13i, and the connector 15 are formed. Next, on the surface of the base material 10, having the electrodes 12a-12i and the like formed thereon, the sensor paint is printed.

Figure 6:
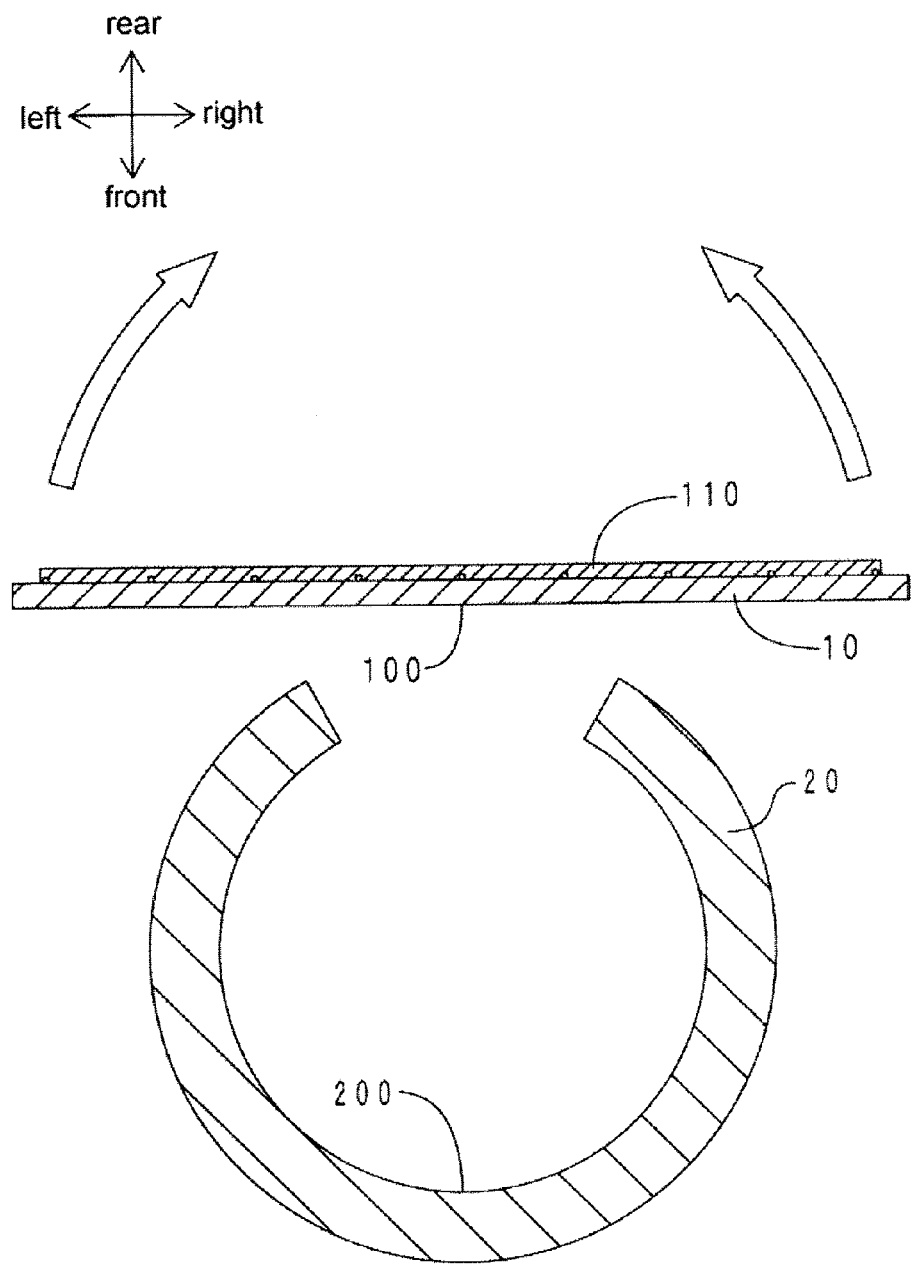
FIG. 6 is a schematic diagram illustrating a first half of a bending-hardening process of a production method of the bending sensor according to the first embodiment.
Figure 7:
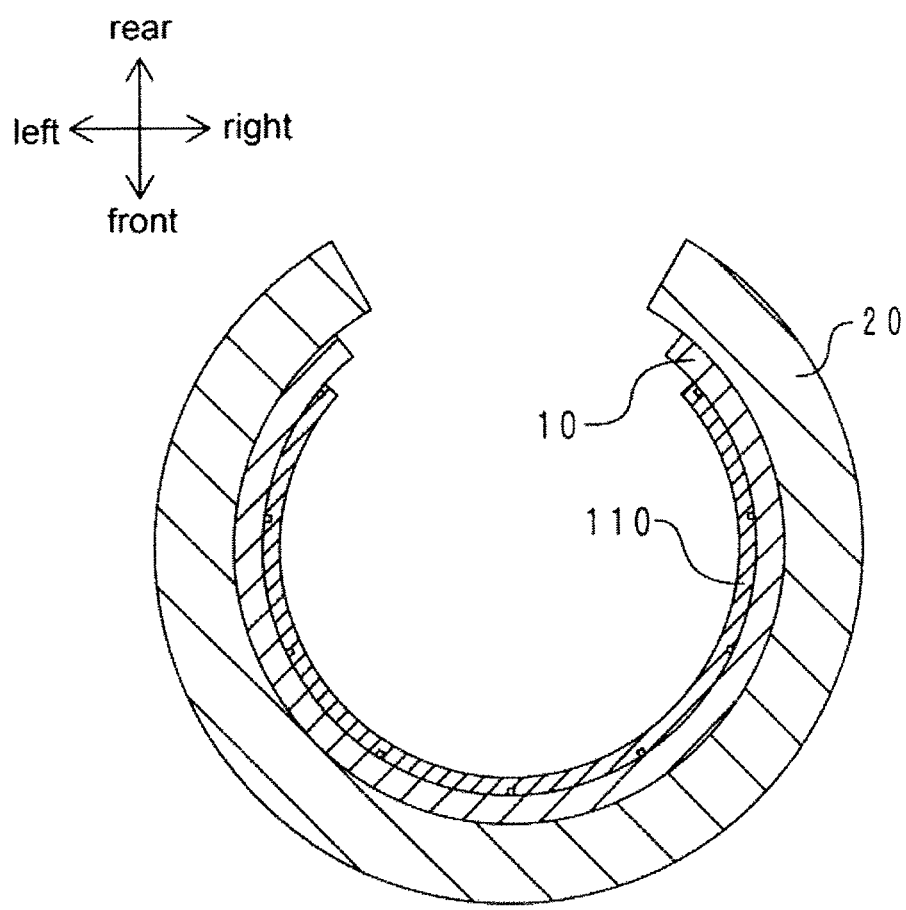
FIG. 7 is a schematic diagram illustrating a second half of the bending-hardening process.

In the bending-hardening process, the base material 10 is bent in a manner that the coated film of the sensor paint is on an inner side, and is heated in such a state to harden the coated film. FIG. 6 illustrates a schematic diagram of a first half of the bending-hardening process. FIG. 7 illustrates a schematic diagram of a second half of the bending-hardening process.

As FIGS. 6 and 7 illustrate, first, the base material 10 having a coated film 110 of the sensor paint formed thereon is pasted on an inner peripheral surface 200 of a C-shaped mold 20. In this case, a front surface 100 of the base material 10 is in contact with the inner peripheral surface 200 of the mold 20. Next, the mold 20 is placed in a drying furnace and kept at a temperature of about 140° C. for 1 hour to subject the coated film 110 to a primary hardening. Next, the mold 20 is kept at a temperature of about 170° C. for 2 hours to subject the coated film 110 to a secondary hardening.

In the load removal process, the base material 10, together with the hardened coated film 110, is removed from the mold 20. The base material 10 and the hardened coated film 110 are restored to their original planar states (see FIG. 6 mentioned earlier) from bent states. With the present process, a strain is input and the cracks C1 are formed in the hardened coated film 110 (the sensor body 11). In this way, the sensor body 11 is produced.

In the cover film printing process, the cover film paint prepared in the paint preparation process is printed by using a screen printer. First, the cover film paint is printed so as to cover respective surfaces of the base material 10, the sensor body 11, and the wirings 13a-13i. Next, the base material 10 after paint printing is placed in a drying furnace at a temperature of about 150° C. for about 30 minutes to harden the coated film. In this way, the cover film 14 is formed. By the above processes, the bending sensor 1 is produced.

[Operation of Bending Sensor]

Figure 8:
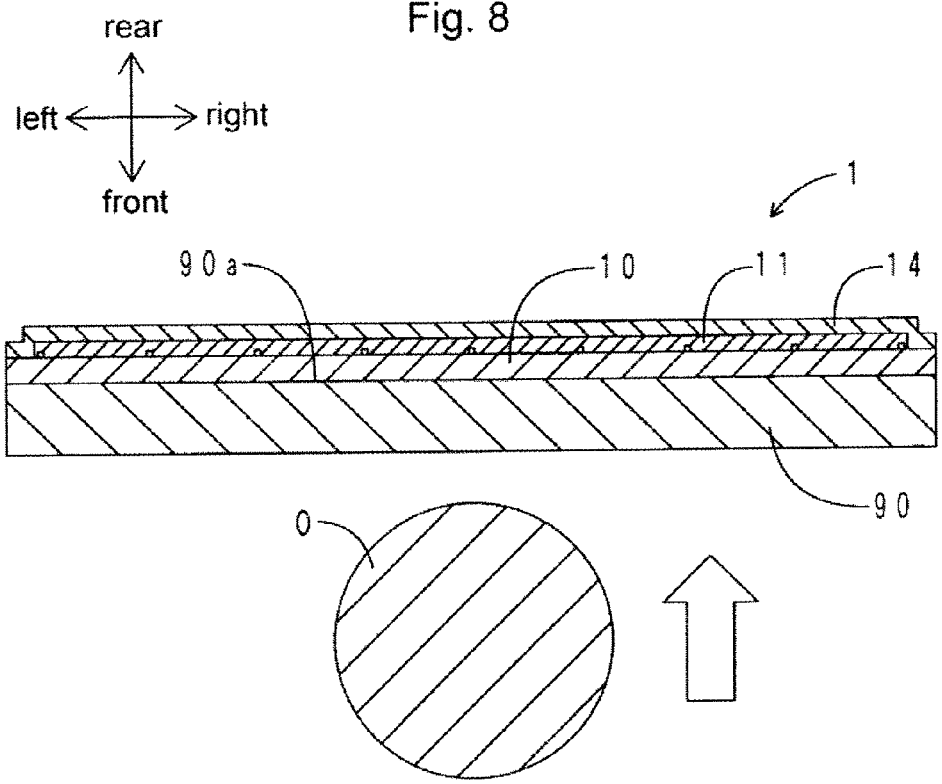
FIG. 8 is a cross sectional view viewed from the bottom of the bending sensor according to the first embodiment before a collision by a colliding object.
Figure 9:
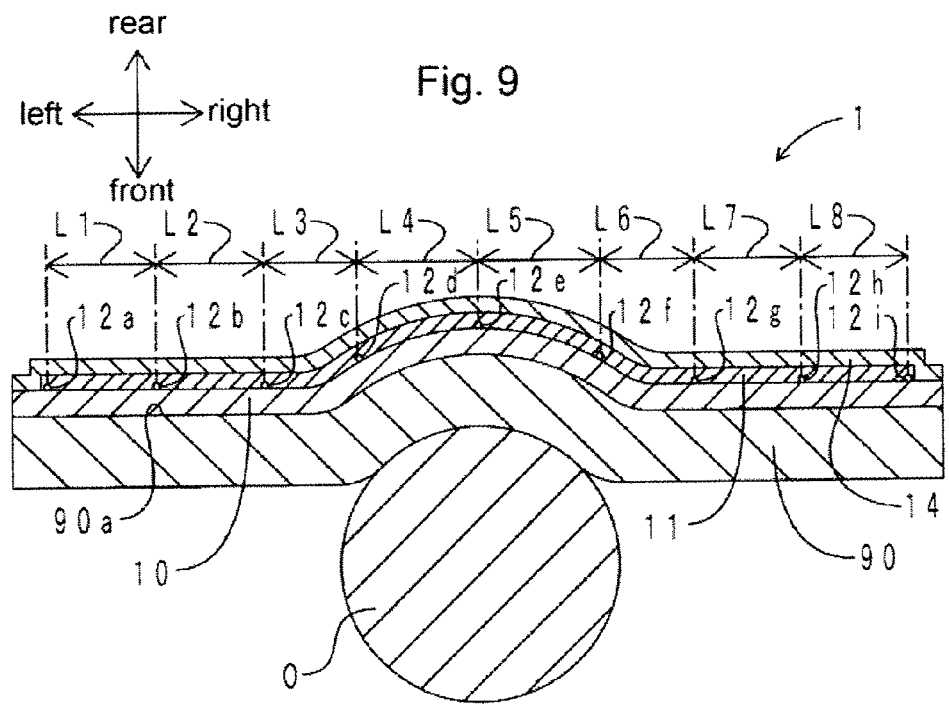
FIG. 9 is a cross sectional view viewed from the bottom of the bending sensor after the collision by the colliding object.

Next, operation of the bending sensor 1 according to the present embodiment is explained. FIG. 8 illustrates a cross sectional view viewed from the bottom of a bending sensor (corresponding to the IV-IV cross section shown in FIG. 3 mentioned earlier) before a collision by a colliding object. FIG. 9 illustrates a cross sectional view viewed from the bottom of the bending sensor after a collision by the colliding object.

As FIGS. 8 and 9 illustrate, the bending sensor 1 is placed on a rear surface 90a of a bumper cover 90 of an automobile. The base material 10 is pasted on the rear surface 90a. When a colliding object O collides against the bumper cover 90 from front, the bumper cover 90 deforms in a manner being depressed backward. The deformation of the bumper cover 90 is transmitted to the bending sensor 1. That is, the deformation of the bumper cover 90 is transmitted to the sensor body 11 and the cover film 14 via the base material 10. This causes the sensor body 11, together with the base material 10 and the cover film 14, to bend in a C-shaped form having an opening facing the front.

In the pre-collision state illustrated in FIG. 8, numerous conductive paths are formed in the sensor body 11 by contact among the carbon beads. Therefore, electrical resistances of the sensor body 11 detected in the measurement sections L1-L8, which are partitioned between the electrodes 12a-12i (see FIG. 4 mentioned earlier), are all relatively small. In contrast, in the post-collision state illustrated in FIG. 9, the cracks C1 open up inside the sensor body 11 due to the bending of the sensor body 11 at an early stage of the collision. Therefore, the conductive paths are cut off. In addition, the conductive paths are cut off due to changes in the contact state of the conductive filler particles. This causes the electrical resistances detected in the bending-deformed measurement sections L3-L6 to become larger as compared to those in the pre-collision state. Therefore, based on the output electrical resistance values, the bending deformation of the sensor body 11, that is, the bending deformation of the bumper cover 90, can be detected.

[Deformed Shape Measurement Method]

Next, a deformed shape measurement method using the bending sensor 1 according to the present embodiment is explained. The deformed shape measurement method according to the present embodiment includes a detection process, a partial shape calculation process, and an entire shape calculation process.

In the detection process, as described above, the bending deformation of the bumper cover 90. which is a measured object, is detected using the bending sensor 1 for each of the measurement sections L1-L8 partitioned by the electrodes 12a-12i.

In the partial shape calculation process, a deformed shape is calculated for each of the measurement sections L1-L8 based on detected deformation data of the measurement sections L1-L8. That is, by using a pre-determined relation between a strain amount $\epsilon$ ($\epsilon = t/R$, where t is a total thickness of the base material 10 and the sensor body 11 (which is known); and R is a radius of curvature during a bending deformation measured from a center of curvature to a rear surface of the base material 10) of the sensor body 11 and an electrical resistance, the strain amount $\epsilon$ is calculated from deformation data (electrical resistance values) for each of the measurement sections L1-L8. From the obtained strain amount ϵ, a curvature and a radius of curvature are calculated for each of the measurement sections L1-L8. That is, a deformed shape is calculated for each of the measurement sections L1-L8.

Figure 10:
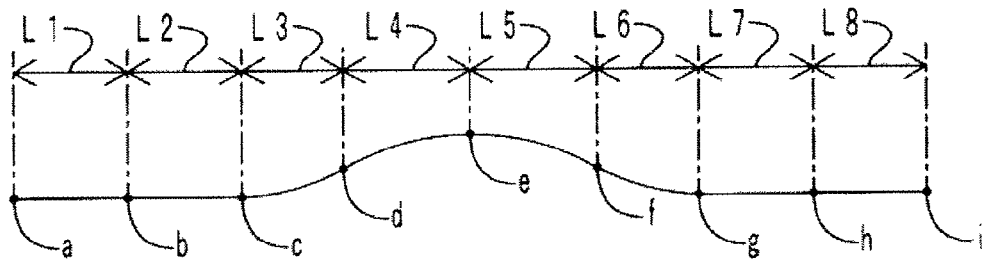
FIG. 10 is a schematic diagram illustrating a deformed shape (estimated shape) of a sensor body calculated by using a deformed shape measurement method according to the first embodiment, with respect to a deformed shape (actual shape) of the sensor body in a post-collision state illustrated in FIG. 9.

In the entire shape calculation process, a deformed shape of the sensor body 11 is calculated by connecting together the calculated deformed shapes of the measurement sections L1-L8. FIG. 10 illustrates a schematic diagram showing a deformed shape (estimated shape) of a sensor body calculated by using the deformed shape measurement method according to the present embodiment, with respect to a deformed shape (actual shape) of the sensor body in the post-collision state illustrated in FIG. 9. As FIG. 10 illustrates, in the present process, the deformed shapes of the measurement sections L1-L8 are connected together in a manner that the neighboring pair of the measurement sections L1-L8 mutually share a tangent line at each of end points a-i thereof. In this way, the entire deformed shape of the sensor body 11 is calculated. That is, the deformed shape of the bumper cover 90 (more specifically, the portion of the bumper cover 90 where the bending sensor 1 is arranged) after the collision is calculated.

[Operation Effects]

Next, operation effects of the bending sensor 1 and the deformed shape measurement method according to the present embodiment are explained. According to the bending sensor 1 of the present embodiment, cracks C1 open up due to bending of the sensor body 11. This causes the conductive paths to be cut off so that the electrical resistance of the sensor body 11 rapidly increases. Therefore, response delay is small.

Figure 17A:
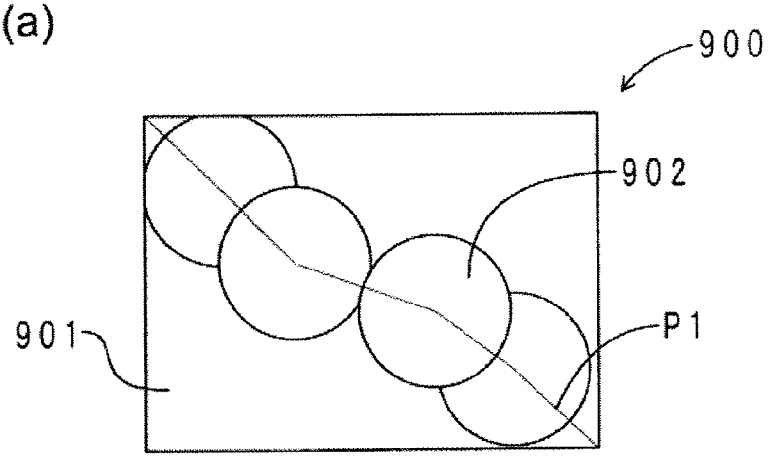
FIG. 17(a) is a schematic diagram enlarging a portion of conductive filler particles in a sensor body in a no-load state before a bending deformation.
Figure 17B:
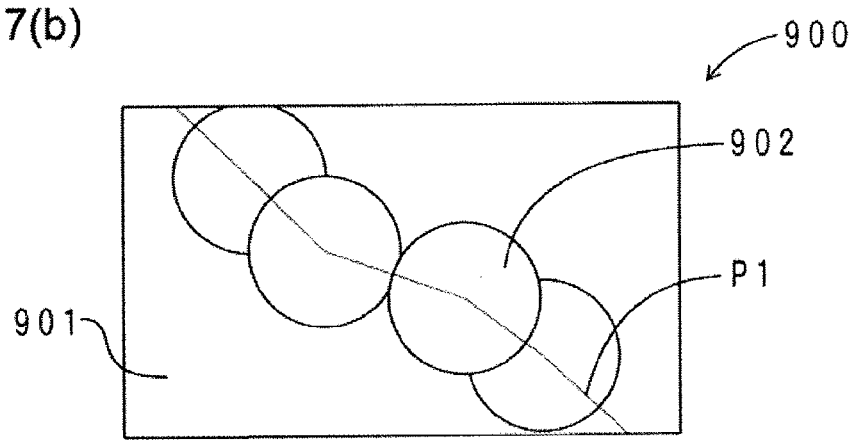
FIG. 17(b) is a schematic diagram enlarging the portion of the conductive filler particles in the sensor body in a state immediately after the bending deformation.
Figure 17C:
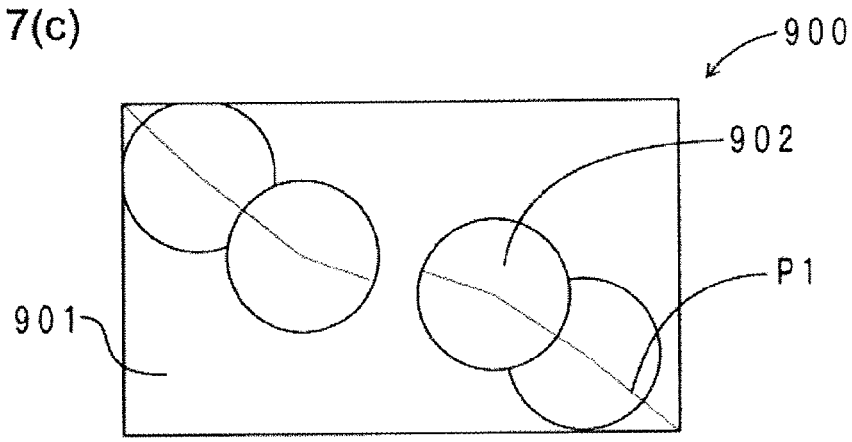
FIG. 17(c) is a schematic diagram enlarging the portion of the conductive filler particles in the sensor body in a state further after the state immediately after the bending deformation.
Figure 18:
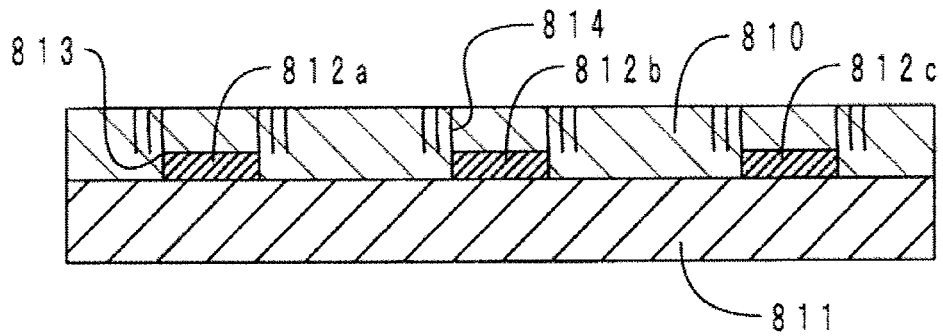
FIG. 18 is a partial cross sectional schematic diagram of a sensor body during crack formation in a case where electrodes are formed by etching.

Further, the conductive paths are cut off primarily due to opening up of the cracks C1. Therefore, as compared to the case where the cutting off of the conductive paths depends only the elastic deformation of the matrix resin (see FIG. 17 mentioned earlier), even a small strain can be accurately detected.

Further, as described above, the speed of the elastic deformation of the matrix resin is influenced by ambient temperature. With respect to this point, the conductive paths of the bending sensor 1 according to the present embodiment are cut off primarily due to opening up of the cracks C1. Therefore, as compared to the case where the conductive paths are cut off depending only on the elastic deformation of the matrix resin (see FIG. 17 mentioned earlier), dependence of a response speed on the ambient temperature is small. Also, as is clear from embodiments to be described below, dependence of the response speed on an input speed of a strain is also small.

Further, in the sensor body 11, about two of the cracks C1 are formed in each unit section U1 having a length of 2 mm along the left-right direction. Therefore, the bending sensor 1 has a high sensitivity. Further, in an early stage of a bending deformation, increase in electrical resistance becomes large due to opening up of the cracks C1.

Further, the sensor body 11 is covered by the cover film 14, thereby inhibiting deterioration of the sensor body 11. Further, when a load is removed after a bending deformation, the sensor body 11 is easily restored to its original shape with the help of an elastic restoring force of the cover film 14.

Further, in the sensor body 11, an average particle size of the carbon beads (conductive filler particles) filled in the epoxy resin (matrix resin) is relatively large. Therefore, the cracks C1 are easily formed along interfaces of the conductive filler particles. In addition, the cracks C1 easily open up due to a bending deformation. Therefore, a fracture strain of the sensor body 11 can be reduced.

Further, the conductive filler particles are spherically shaped. Therefore, the conductive filler particles can be mixed in the matrix resin in a state close to densest packing. Thereby, three-dimensional conductive paths are easily formed, and conductivity of the sensor body 11 in a no-load state increases. Further, with respect to a bending deformation of the sensor body 11, the contact state of the conductive filler particles easily changes. Therefore, a change in the electrical resistance is large. Further, the carbon beads have less functional groups. Therefore, fractures easily occur at interfaces with the matrix resin, and the cracks C1 are easily formed in the sensor body 11.

Figure 1A:
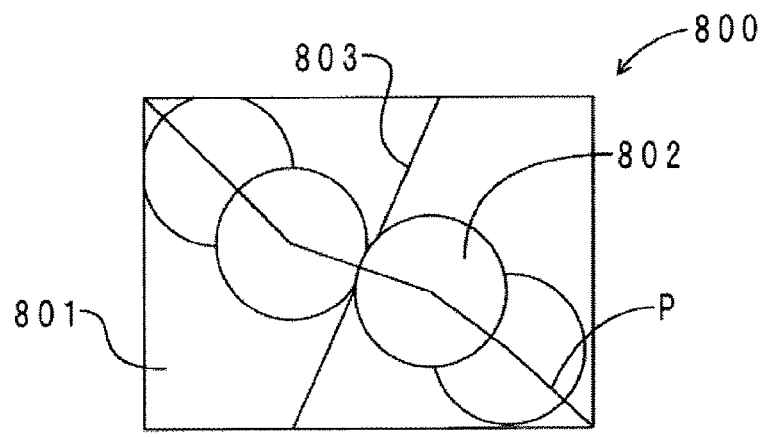
FIG. 1(a) is a schematic diagram enlarging a portion of a crack in a sensor body in a no-load state before a bending deformation.
Figure 1B:
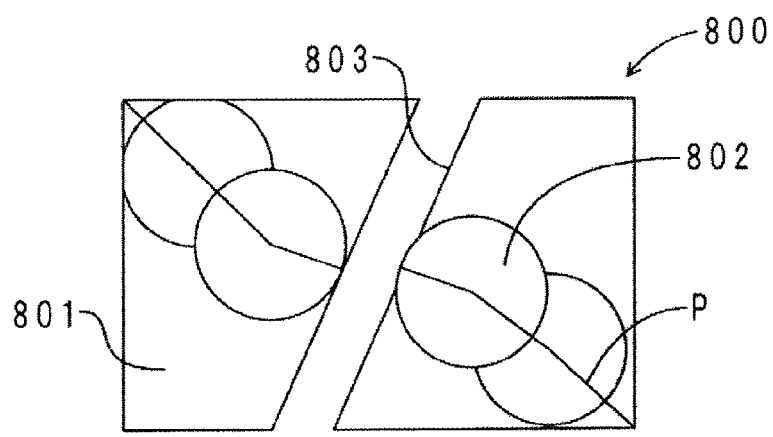
FIG. 1(b) is a schematic diagram enlarging the portion of the crack in the sensor body in a state after the bending deformation.
Figure 2:
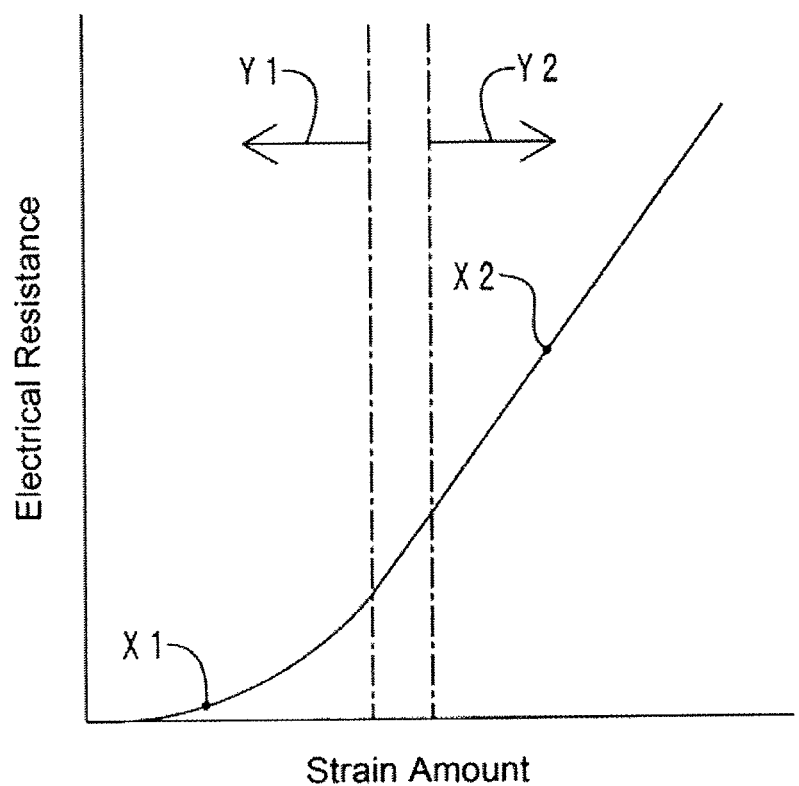
FIG. 2 is a schematic graph illustrating a relation between a strain amount of a sensor body and an electrical resistance.

Further, when the sensor body 11 is produced, the coated film of the sensor paint is hardened in a state in which the sensor body 11 is bent toward a direction opposite to a bending deformation to be detected. Thereby, at the stage where the bending sensor 1 is attached on the bumper cover 90, a strain has been input in advance in the sensor body 11. Therefore, a total strain amount of the sensor body 11 during a bending deformation is a sum of the strain amount that has been input in advance and a strain amount accompanying the bending deformation. When the total strain amount of the sensor body 11 is large, a detection region can be shifted into a region beyond the fracture strain of the sensor body 11, that is, a region where the relation between the strain amount and the electrical resistance is nearly linear (see FIG. 2 mentioned earlier). Therefore, according to the bending sensor 1 of the present embodiment, sensitivity is enhanced. Further, the strain amount can be easily calculated from the electrical resistance.

Further, according to the deformed shape measurement method of the present embodiment, the deformed shape of the bumper cover 90 can be easily measured by using the bending sensor 1. As described above, for the bending sensor 1, a response delay is unlikely to occur. Therefore, a time lag is unlikely to occur between the actual deformed shape of the bumper cover 90 and the calculated deformed shape. Further, by using the region where the relation between the strain amount and the electrical resistance is substantially linear as the detection region of the bending sensor 1, the deformed shape of the bumper cover 90 can be accurately measured.

Second Embodiment

Differences between a bending sensor and a deformation measurement method according to the present embodiment and the bending sensor and the deformation measurement method according to the first embodiment are the number of sensor bodies and the attachment method of the bending sensor to a measured object. Therefore, only the differences are explained here.

Figure 11:
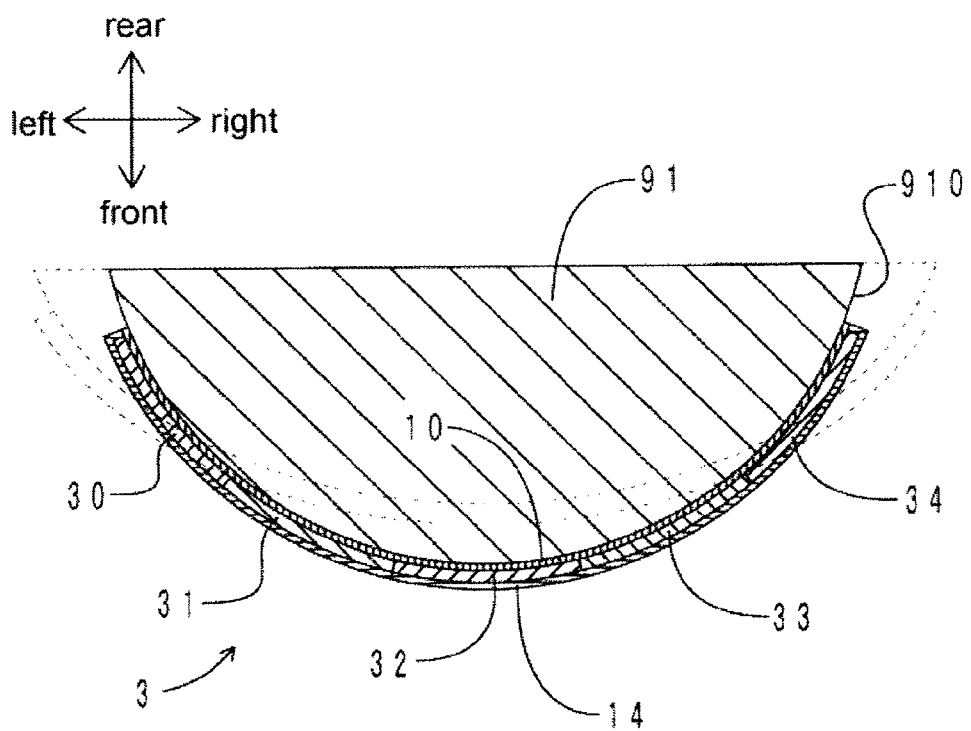
FIG. 11 is a cross sectional view viewed from the bottom of a bending sensor according to a second embodiment in an attached state.

FIG. 11 illustrates a cross sectional view viewed from the bottom of a bending sensor in an attached state. In FIG. 11, members corresponding to those in FIG. 8 mentioned earlier are denoted by the same reference numerals. Further, in FIG. 11, electrodes and wirings are omitted for convenience of explanation.

As FIG. 11 illustrates, a measured object 91 is made of clay, and has a shape of a semicircular column. A bending sensor 3 is attached to an outer curved surface 910 of the measured object 91. A longitudinal direction of the bending sensor 3 approximately coincides with a circumferential direction of the outer curved surface 910. The bending sensor 3 includes a base material 10, five sensor bodies 30-34, and a cover film 14. The bending sensor 3 is attached in a manner that the base material 10 is in contact with the outer curved surface 910. The base material 10 is pasted on the outer curved surface 910. The five sensor bodies 30-34 are arranged in series along the longitudinal direction of the bending sensor 3. Configuration of each of the sensor bodies 30-34 is the same as the configuration of the sensor body according to the first embodiment. The sensor bodies 30-34 each are arranged in a state in which a sensor body is further bent toward an opposite direction from a state in which the sensor body is restored to its original planar state (see FIG. 6 mentioned earlier) from a bent state during the hardening of the sensor paint (see FIG. 7 mentioned earlier). That is, a strain has been input in advance in the sensor bodies 30-34. Further, in the attached state of the bending sensor 3, the cracks formed in the sensor bodies 30-34 are open. Therefore, many of the conductive paths are in a state of being cut off.

For example, when the measured object 91 deforms in a manner being extended in a left-right direction and compressed in a front-back direction, as being illustrated by dashed lines in FIG. 11, the sensor bodies 30-34, together with the outer curved surface 910, undergo bending deformation in a direction such that a radius of curvature increases, that is, undergo bending deformation so as to become closer to a planar state. In this case, the cracks close up, and, due to changes in the contact state among the conductive filler particles, the conductive paths are restored. Thereby, electrical resistances respectively detected in the sensor bodies 30-34 become smaller with respect to an attached state before the bending deformation. Therefore, based on the output electrical resistance values, the bending deformation of the measured object 91 can be detected.

Further, by using a pre-determined relation between a strain amount of the sensor bodies 30-34 and electrical resistance, a strain amount is calculated from deformation data (electrical resistance value) for each of the measurement sections of the sensor bodies 30-34. From the obtained strain amount, a curvature and a radius of curvature are calculated for each of the measurement sections. Then, a deformed shape is calculated for each of the measurement sections. By connecting together the calculated deformed shapes of the measurement sections, deformed shapes of the sensor bodies 30-34 in the measured object are each calculated. By connecting together these deformed shapes, the deformed shape of the entire bending sensor 3, that is, the measured object 91, is calculated.

The bending sensor 3 according to the present embodiment has the same operation effects as the bending sensor according to the first embodiment. Further, the bending sensor 3 according to the present embodiment has five sensor bodies 30-34 arranged in series, and is therefore suitable for detecting a bending deformation of the long measured object 91.

Third Embodiment

Differences between a bending sensor and a deformation measurement method according to the present embodiment and the bending sensor and the deformation measurement method according to the first embodiment are the shape of the electrodes and the composition and formation method of the wirings. Therefore, only the differences are explained here.

Figure 21:
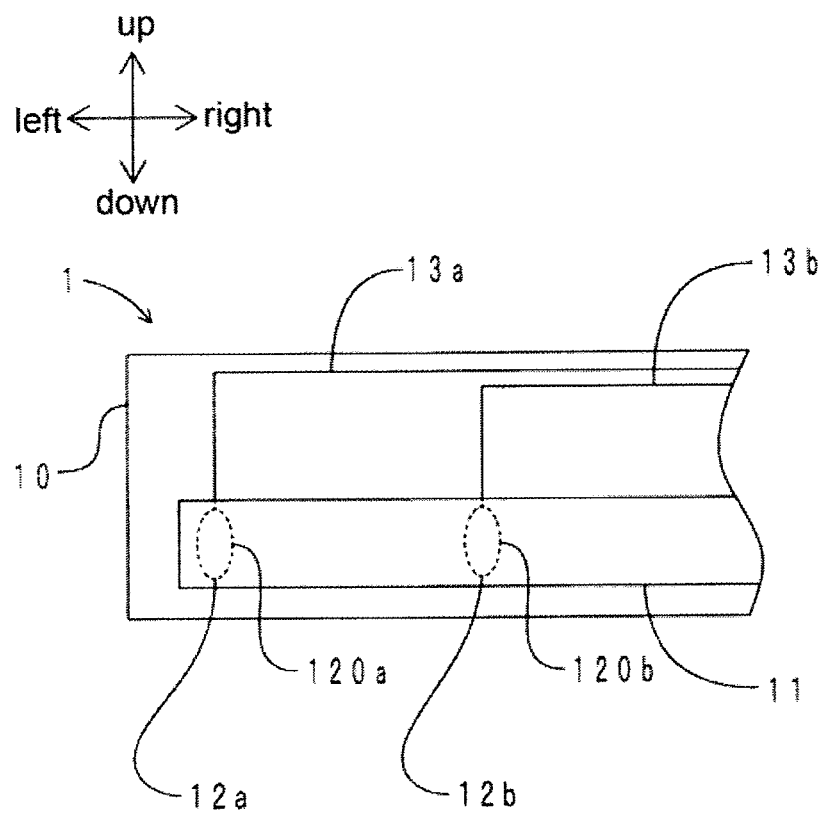
FIG. 21 is an enlarged view of a portion of a left end of a bending sensor according to a third embodiment.

FIG. 21 illustrates an enlarged view of a portion of a left end of the bending sensor according to the present embodiment. For convenience of explanation, a cover film is omitted from the illustration shown in FIG. 21. FIG. 21 corresponds to FIG. 3 mentioned earlier. Therefore, members corresponding to those in FIG. 3 are denoted by the same reference numerals.

As FIG. 21 illustrates, electrodes 12a and 12b have elliptical surfaces. Edge lines of the electrodes 12a and 12b in a left-right direction (the extension direction of the sensor body 11) have curved portions 120a and 120b. The electrodes 12a and 12b are interposed between the sensor body 11 and the base material 10. The electrodes 12a and 12b are formed by screen-printing an electrode paint, in which a silver powder is mixed with a resin, on the base material 10. The electrode paint is included in a conductive paint of the present invention.

Wirings 13a and 13b respectively connect the electrodes 12a and 12b to a connector (not shown in the figure). The wirings 13a and 13b are formed by etching a copper foil, which is pasted in advance on a surface (rear surface) of the base material 10, into a predetermined pattern. Although not shown in the figure, other electrodes 12c-12i of the bending sensor according to the present embodiment are also formed in the same way as the electrodes 12a and 12b. Further, wirings 13c-13i are also formed in the same way as the wirings 13a and 13b.

The bending sensor and deformation measurement method according to the present embodiment, with respect to portions having common configurations, have the same operation effects as the bending sensor and deformation measurement method according to the first embodiment. According to the bending sensor 1 of the present embodiment, the wirings 13a-13i are formed by etching a copper foil. Therefore, the wirings 13a-13i can be formed to be thin lines at a narrow pitch. Thus, even when the number of the electrodes 12a-12i is large, the bending sensor 1 can be downsized.

Figure 19:
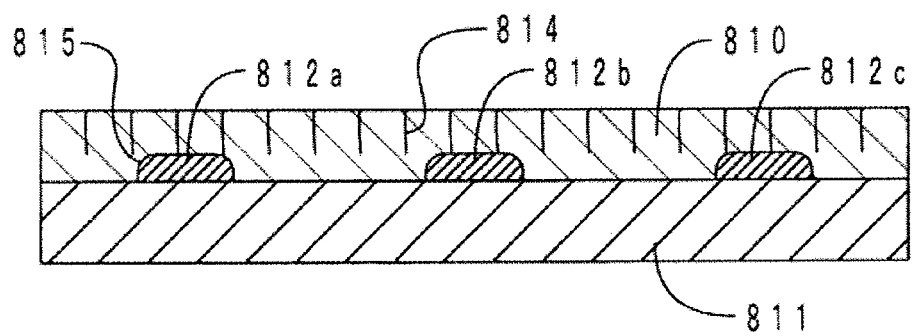
FIG. 19 is a partial cross sectional schematic diagram of a sensor body during crack formation in a case where electrodes are formed by printing.
Figure 20:
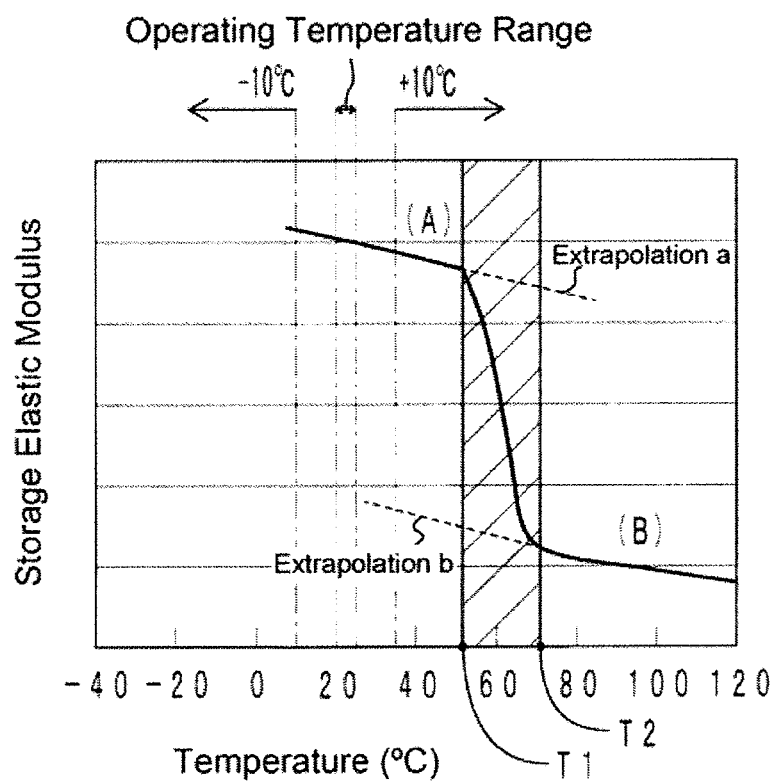
FIG. 20 is a graph illustrating an example of variation of a storage elastic modulus with respect to temperature.

On the other hand, the electrodes 12a-12i are formed by printing the electrode paint. Therefore, edges of the electrodes 12a-12i are unlikely to become angular. That is, on each edge surface of the electrodes 12a-12i in the left-right direction, there is a chamfered portion (see FIG. 19 mentioned earlier). A stress is unlikely to be concentrated on the chamfered portion. Further, the electrode paint uses a resin as a binder. Therefore, adhesion between the electrodes 12a-12i and the sensor body 11 is good. Further, the electrodes 12a-12i are elliptically shaped. That is, the edge lines of the electrodes 12a and 12b in the left-right direction have the curved portions 120a and 120b. Therefore, a stress is unlikely to be concentrated. Thus, cracks are unlikely to be formed concentrated around the electrodes 12a-12i. That is, cracks can be formed nearly uniformly over the entire sensor body 11. Therefore, according to the bending sensor of the present embodiment, a stable sensor response can be obtained, regardless of a measurement section.

Fourth Embodiment

A difference between a bending sensor and a deformation measurement method according to the present embodiment and the bending sensor and the deformation measurement method according to the first embodiment is that a strain adjustment plate is arranged on a front surface of the base material via an adhesion layer. Therefore, only the difference is explained here.

Figure 22:
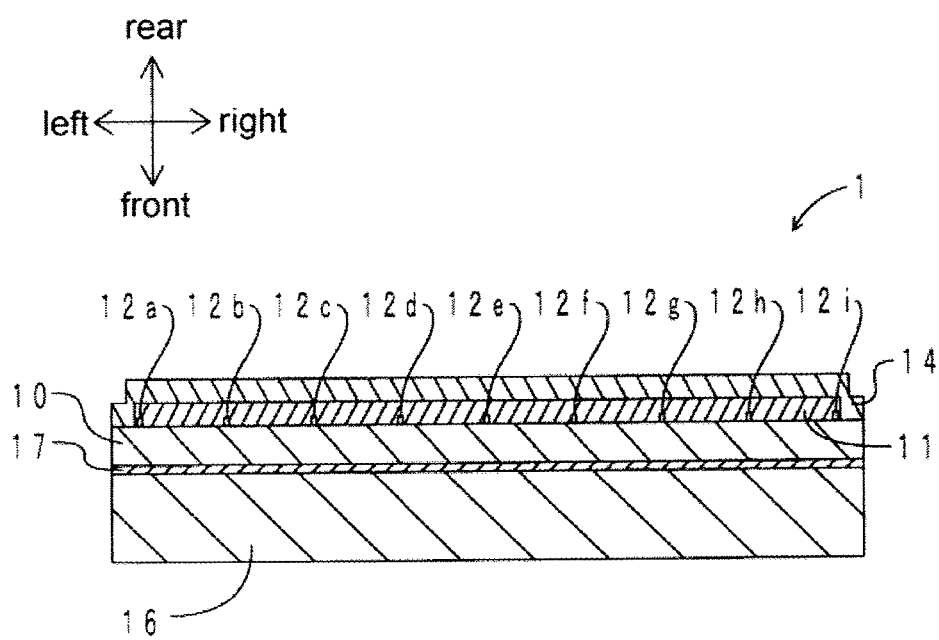
FIG. 22 is a cross sectional view in a left-right direction of a bending sensor according to a fourth embodiment.

FIG. 22 illustrates a cross sectional view in a left-right direction of a bending sensor according to the present embodiment. FIG. 22 corresponds to the cross sectional view taken along the line IV-IV of FIG. 3 mentioned earlier. In FIG. 22, members corresponding to those in FIG. 4 are denoted by the same reference numerals.

As FIG. 22 illustrates, a bending sensor 1 includes a base material 10, a sensor body 11, electrodes 12a-12i, wirings, a cover film 14, a strain adjustment plate 16, and an adhesion layer 17. The base material 10, the sensor body 11, the electrodes 12a-12i, the wirings, and the cover film 14 are the same as those in the first embodiment. An operating temperature of the bending sensor 1 is set to about 20° C. The base material 10 is made of a polyimide. The polyimide (base material 10) has a glass-rubber transition region of 300-500° C., which is on a higher temperature side than 30° C. (the operating temperature of the bending sensor 1 plus 10° C.).

The strain adjustment plate 16 is made of a glass fabric base material epoxy resin (FR-4). The glass fabric base material epoxy resin (strain adjustment plate 16) has a glass-rubber transition region of 100-150° C., which is on a higher temperature side than 30° C. The strain adjustment plate 16 has a shape of a flat plate extending in the left-right direction. The strain adjustment plate 16 has a thickness of about 0.5 mm. The strain adjustment plate 16 has a width (length in an up-down direction) of nearly the same as a width of the base material 10. The strain adjustment plate 16 is arranged in front of the base material 10. The strain adjustment plate 16 and the base material 10 are bonded to each other via the adhesion layer 17.

The adhesion layer 17 is made of an epoxy-based inelastic adhesive. The inelastic adhesive (the adhesion layer 17) has a glass-rubber transition region of 40-70° C., which is on a higher temperature side than 30° C. The adhesion layer 17 has a thickness of about 100 μm.

The bending sensor and the deformation measurement method according to the present embodiment, with respect to portions having common configurations, have the same operation effects as the bending sensor and deformation measurement method according to the first embodiment. According to the bending sensor 1 of the present embodiment, the base material 10, the strain adjustment plate 16, and the adhesion layer 17 are all formed from materials having a glass-rubber transition region on the higher temperature side than the operating temperature of the bending sensor 1 plus 10° C. Therefore, in a temperature range where the bending sensor 1 is used, the base material 10, the strain adjustment plate 16, and the adhesion layer 17 are all in a glass state. Further, in the temperature range where the bending sensor 1 is used, a change from a glass state to a rubber state also does not occur. Thus, in the base material 10 and the like, a bending deformation is unlikely to be relaxed. That is, the bending deformation is accurately transmitted to the sensor body 11. As a result, the detection accuracy of the bending deformation is unlikely to decrease. Further, the base material 10 and the like are all formed with rigid materials in a glass state. Therefore, the bending deformation is promptly transmitted to the sensor body 11. Thus, a response delay is unlikely to occur.

Fifth Embodiment

Differences between a bending sensor according to the present embodiment and the bending sensor according to the first embodiment are that the number of electrodes is two, that a plurality of detection sections are arranged among the electrodes, and the formation method of the cracks. Therefore, only the differences are explained here.

Figure 29:
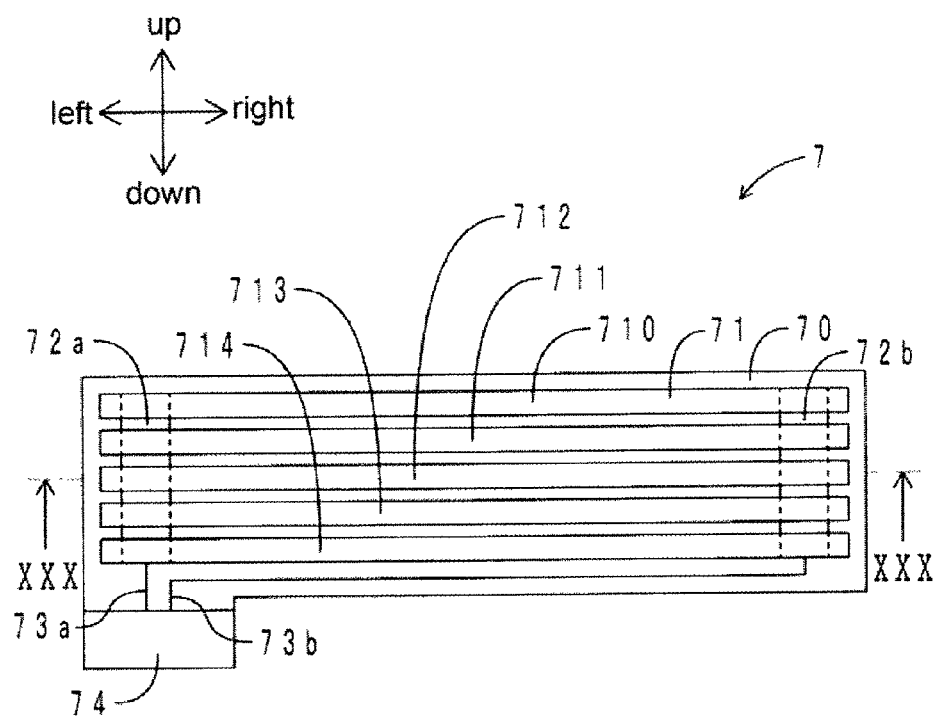
FIG. 29 is a front view of a bending sensor according to a fifth embodiment.
Figure 30:
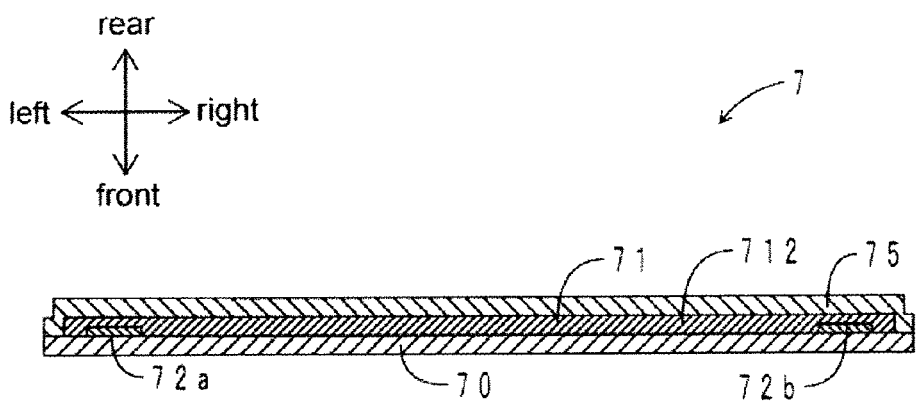
FIG. 30 is a cross sectional view taken along a line XXX-XXX shown in FIG. 29.

First, configuration of the bending sensor according to the present embodiment is explained. FIG. 29 illustrates a front view of the bending sensor according to the present embodiment. FIG. 30 illustrates a cross sectional view taken along a line XXX-XXX shown in FIG. 29. For convenience of explanation, a cover film is removed from the illustration shown in FIG. 29. As FIGS. 29 and 30 illustrate, a bending sensor 7 includes a base material 70, a sensor body 71, electrodes 72a and 72b, wirings 73a and 73b, a connector 74, and a cover film 75.

The base material 70 is made of a polyimide, and has a belt-like shape extending in a left-right direction. The left-right direction corresponds to a juxtaposing direction of the present invention. The base material 70 has a film thickness of about 300 μm. The connector 74 is arranged at a lower left end of the base material 70. The base material 70, similar to the first embodiment, is pasted on a rear surface of a bumper cover (not shown in the figures).

The sensor body 71 has five detection sections 710-714. The detection sections 710-714 each have a belt-like shape extending in the left-right direction. The detection sections 710-714 are juxtaposed in an up-down direction. The up-down direction corresponds to an orthogonal direction of the present invention. The detection sections 710-714 each have a thickness of about 100 μm. The detection sections 710-714 are fixed on a surface (rear surface) of the base material 70.

The sensor body 71 is made from an epoxy resin (matrix resin) and carbon beads (conductive filler particles) mixed in the epoxy resin. A filling rate of the carbon beads is about 45% by volume when a volume of the sensor body 71 is 100% by volume. Numerous cracks C1 have been formed in advance in the sensor body 71 (see FIG. 5 mentioned earlier). The cracks C1 are arranged extending in a direction crossing the juxtaposing direction, that is, in a thickness-wise direction (front-rear direction) of the sensor body 71. About two of the cracks C1 are formed in each unit section U1 having a length of 2 mm along the left-right direction of the sensor body 71.

The electrodes 72a and 72b each have a reed-like shape extending in the up-down direction. The electrodes 72a and 72b each are interposed between the base material 70 and the sensor body 71. The electrode 72a is connected to a left end of the sensor body 71. The electrode 72b is connected to a right end of the sensor body 71. In other words, the five detection sections 710-714 are erected between a left-and-right pair of electrodes 72a and 72b. The wiring 73a connects the electrode 72a and the connector 74. The wiring 73b connects the electrode 72b and the connector 74. The connector 74 connects to an arithmetic unit (not shown in the figure).

The cover film 75 is made of an acryl rubber, and has a belt-like shape extending in the left-right direction. The cover film 75 covers the base material 70, the sensor body 71, the electrodes 72a and 72b, and the wirings 73a and 73b from a rear side. The cover film 75 has a thickness of about 20 μm.

Next, a production method of the bending sensor 7 according to the present embodiment is explained. The production method of the bending sensor 7 according to the present embodiment includes a paint preparation process, a printing process, a hardening process, a crack formation process, and a cover film printing process.

In the paint preparation process, a sensor paint, an electrode paint, a wiring paint, a connector paint, and a cover film paint are each prepared. These paints are each the same as in the first embodiment, and thus, an explanation thereof is omitted.

In the printing process, the paints, except the cover film paint, are printed on a surface of the base material 70 using a screen printer. First, on the surface of the base material 70, the electrode paint, the wiring paint, and the connector paint are printed in order. Next, the base material 70 after the paint printing is placed in a drying furnace at a temperature of about 140° C. for about 30 minutes to harden the coated films. In this way, the electrodes 72a and 72b, the wirings 73a and 73b, and the connector 74 are formed. Next, the sensor paint is printed on the surface of the base material 70 having the electrodes 72a and 72b and the like formed thereon,.

In the hardening process, the base material 70 having the sensor paint printed thereon is heated to harden the coated film. Specifically, the base material 70 having the coated film of the sensor paint formed thereon is placed in a drying furnace and kept at a temperature of about 140° C. for 1 hour to subject the coated film to a primary hardening. Next, the base material 70 is kept at a temperature of about 170° C. for 2 hours to subject the coated film to a secondary hardening.

In the crack formation process, cracks are formed in the coated film. The coated film is included in "a precursor of a sensor body" of the present invention. Specifically, as FIG. 28 mentioned earlier illustrates, a mold for crack formation has a curved mold surface. On the other hand, the base material 70 has a shape of a flat plate. By pushing the base material 70 against the mold surface, cracks C1 are formed in the coated film. In this way, the sensor body 71 is produced.

In the cover film printing process, the cover film paint prepared in the paint preparation process is printed by using a screen printer. First, the cover film paint is printed so as to cover surfaces of the base material 70, the sensor body 71, the electrodes 72a and 72b, and the wirings 73a and 73b. Next, the base material 70 after the paint printing is placed in a drying furnace at a temperature of about 150° C. for about 30 minutes to harden the coated film. In this way, the cover film 75 is formed. By the above processes, the bending sensor 7 is produced.

Next, operation of the bending sensor 7 according to the present embodiment is explained. As FIGS. 8 and 9 mentioned earlier illustrate, for example, when a colliding object O collides against the bumper cover 90 from front, the bumper cover 90 deforms in a manner being depressed backward. The deformation of the bumper cover 90 is transmitted to the bending sensor 7, thereby, the sensor body 71, together with the base material 70 and the cover film 75, bends in a manner projecting backward. Due to the bending of the sensor body 71, the cracks in the sensor body 71 open up. Therefore, the conductive paths are cut off. In addition, the conductive paths are cut off due to change in the contact state among the conductive filler particles. Thereby, detected electrical resistance becomes larger as compared to the pre-collision state. Therefore, based on the output electrical resistance, the bending deformation of the sensor body 71, that is, the bending deformation of the bumper cover 90, can be detected.

The bending sensor 7 according to the present embodiment, with respect to portions having common configurations, have the same operation effects as the bending sensor according to the first embodiment. According to the bending sensor 7 of the present embodiment, the sensor body 71 has the five detection sections 710-714. The detection sections 710-714 each extend in the left-right direction. The detection sections 710-714 are mutually lined up in the up-down direction. Therefore, as compared to a bending sensor having a single detection section extending in the left-right direction, when the total area of detection sections is the same, fluctuation in the electrical resistance can be reduced.

Further, according to the bending sensor 7 of the present embodiment, the detection sections 710-714 are mutually electrically connected in parallel between the electrode 72a and the electrode 72b. For a parallel connection, when the electrical resistances of the detection sections 710-714 are respectively denoted by Ra, Rb, Rc, Rd, and Re, and the total electrical resistance is denoted by R, the relation 1/R=1/Ra+1/Rb+1/Rc+1/Rd+1/Re holds. Therefore, even when there is fluctuation in electrical resistance in any one of the detection sections 710-714, fluctuation in the sensor body 71 as a whole can be reduced. Therefore, fluctuation in the total electrical resistance R can be reduced. Further, according to the bending sensor 7 of the present embodiment, the detection sections 710-714 are connected in parallel. Therefore, even when the number of the arranged detection sections 710-714 increases, the total electrical resistance is hard to increase.

Further, according to the bending sensor 7 of the present embodiment, the sensor body 71 has five detection sections 710-714. The five detection sections 710-714 each extend in the left-right direction. The five detection sections 710-714 are mutually juxtaposed in the up-down direction. Therefore, as compared to a bending sensor having a single detection section extending in the left-right direction, when the total area of the detection sections is the same, widths of the detection sections 710-714 in the up-down direction can be made narrow. Therefore, the density of the cracks C1 can be increased. That is, the fluctuation in electrical resistance can be reduced, and the sensitivity of the bending sensor 7 can be enhanced.

Sixth Embodiment

A difference between a bending sensor according to the present embodiment and the bending sensor according to the fifth embodiment is that the sensor body has a zigzag shape and is extending between two electrodes. Only the difference is explained here.

Figure 31:
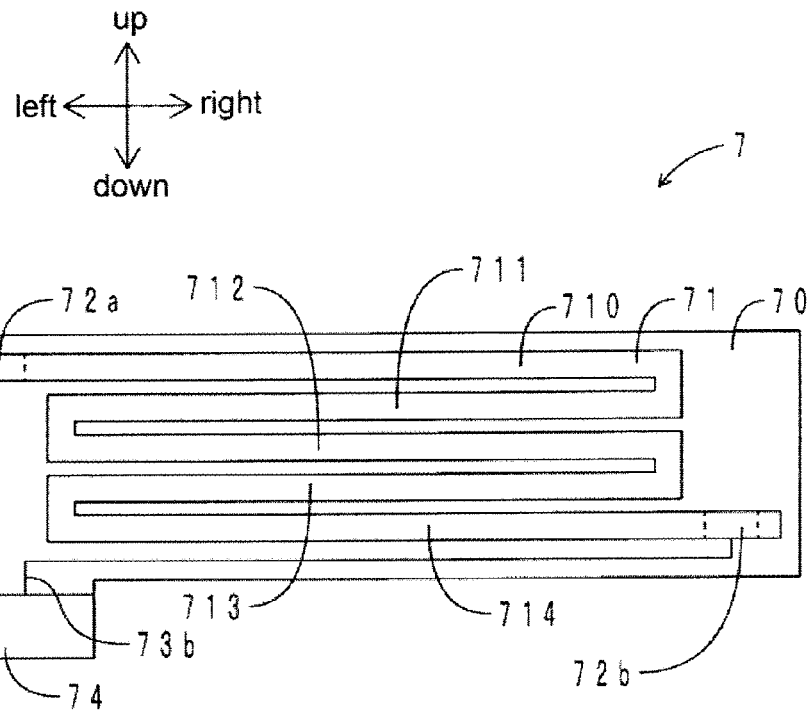
FIG. 31 is a front view of a bending sensor according to a sixth embodiment.

FIG. 31 illustrates a front view of the bending sensor according to the present embodiment. For convenience of explanation, a cover film is removed from the illustration. Members corresponding to those in FIG. 29 are denoted by the same reference numerals. As FIG. 31 illustrates, an electrode 72a is arranged at an upper-left corner of a base material 70. An electrode 72b is arranged at a lower-right corner of the base material 70. A sensor body 71 connects the electrode 72a and the electrode 72b in a zigzag manner. The sensor body 71 has five detection sections 710-714. The detection sections 710-714 each have a belt-like shape extending in a left-right direction. The detection sections 710-714 are juxtaposed in an up-down direction. A right end of the detection section 710 and a right end of the detection section 711, a left end of the detection section 711 and a left end of the detection section 712, a right end of the detection section 712 and a right end of the detection section 713, and a left end of the detection section 713 and a left end of the detection section 714, respectively, are connected. That is, the detection sections 710-714 are connected in series.

The bending sensor 7 according to the present embodiment, with respect to parts having common configurations, have the same operation effects as the bending sensor according to the fifth embodiment. According to the bending sensor 7 of the present embodiment, the detection sections 710-714 are mutually electrically connected in series between the electrode 72a and the electrode 72b. For a serial connection, when the electrical resistances of the detection sections 710-714 are respectively denoted by Ra, Rb, Rc, Rd, and Re, and the total electrical resistance is denoted by R, the relation R=Ra+Rb+Rc+Rd+Re holds. Therefore, even when there is fluctuation in electrical resistance in any one of the detection sections 710-714, fluctuation in the sensor body 71 as a whole can be reduced. Therefore, fluctuation in the total electrical resistance R can be reduced.

Further, according to the bending sensor 7 of the present embodiment, the five detection sections 710-714 are serially connected in a manner similar to one-stroke drawing. Therefore, even when the number of arranged detection sections 710-714 is increased, there is no need to change configurations of the portions connecting the sensor body 71 and the electrodes 72a and 72b.

<Other>

In the above, the embodiments of the bending sensor and deformation measurement method of the present invention are explained. However, the embodiments of the bending sensor and deformation measurement method of the present invention are not limited by the above-described configurations. Various modifications and improvements by those skilled in the art are also possible.

For example, in order to form cracks in a sensor body, in the first to fourth embodiments, during a bending sensor production process, a coated film of a sensor paint is hardened while being bent toward a direction opposite to a bending deformation to be detected. In this case, the degree of the bending may be properly adjusted by taking into consideration the density and size of the formed cracks, the strain amount to be input, and the like. Further, after the load removal process, more bending processes may be further added. That is, with respect to a sensor body that has been restored to its planar state after being hardened during a bending process, the bending-restoring process may be further repeated. Or, the sensor body is bent toward a direction opposite to the bending direction during the bending-hardening process. By doing so, cracks are increased and can be distributed in the matrix resin.

Further, the method for forming cracks in a sensor body is not limited by the above-described embodiments. For example, it is possible to form convexo-concave portions in advance on a surface of a base material, and print the sensor paint on the convexo-concave surface before hardening. By doing so, a stress is concentrated on angular portions of the convexo-concave portions when the coated film is hardened. Thereby, cracks are easily formed. After hardening, it is desirable that the sensor body be further subjected to bending processing. By doing so, cracks can be increased in number and can be dispersed in the matrix resin. Further, by devising distribution and the like of the convexo-concave portions to be formed, distribution and the like of the cracks can be adjusted.

Further, in the first-fourth embodiments, along with the formation of the cracks, a strain was input in the sensor body. However, it is not always necessary to be input a pre-strain in a sensor body.

As the cover film, a synthetic rubber such as an acryl rubber or a natural rubber can be used. As the base material, a resin film, such as a highly insulative polyethylene, a polyethylene terephthalate (PET), or the like, can be used, besides a polyimide. Further, by adjusting the thickness of the base material, the sensitivity of the bending sensor can be adjusted. For example, when the thickness of the base material increases, the strain amount of the sensor body during a bending deformation increases. This can enhance the sensitivity of the bending sensor.

The number and arrangement of the electrodes are not limited by the above embodiments. By increasing the number of the electrodes, measurement sections can be more finely partitioned. This allows a shape of a measured object to be more finely partitioned and measured. As a result, the entire deformed shape of the measured object can be more accurately calculated.

Further, the shape of the electrodes is not limited by the above embodiments. From a point of view of inhibiting stress concentration on edge portions of the electrodes during the formation of the cracks, it is desirable that the electrodes be formed so as to have such a shape that edge lines in the extension direction of the sensor body have curved portions. FIG. 23 illustrates examples of a surface shape of an electrode. In FIG. 23, the left-right direction corresponds to the extension direction of the sensor body. As FIG. 23 illustrates, examples of a preferable surface shape of the electrodes include (a) a circular shape, (b) an elliptical shape, (c) an oblong shape (a shape formed by connecting a pair of opposing semicircles with straight lines), and the like. Further, in the case where the electrodes are formed by printing, besides the screen printing, inkjet printing, flexo printing, gravure printing, screen printing, pad printing, lithography, and the like can be used.

Further, according to the bending sensor of the second embodiment, on the surface of the one-piece base material, a plurality of sensor bodies are arranged, and all of the sensor bodies are covered by the one-piece cover coat. However, for each of the sensor bodies, a base material and a cover film may also be independently provided. That is, a plurality of the bending sensors according the first embodiment may be linked together and attached to a measured object. The measured object may be arranged in contact with one of the cover film side and the base material side. Further, the bending sensors may be linearly arranged or arranged in a curved fashion.

The matrix resin and the conductive filler particles that constitute the sensor body also are not limited by the above embodiments. As the matrix resin, a thermoset resin or a thermoplastic resin may be used. It is desirable that the matrix resin be selected by taking into consideration compatibility with the conductive filler particles to be described later. Examples of the thermoset resin include, for example, an epoxy resin, an alkyd resin, a phenol resin, a urea resin, a melamine resin, an unsaturated polyester resin, a polyurethane, a polyimide, and the like. Examples of the thermoplastic resin include, for example, a polyethylene (PE), a polypropylene (PP), a polyvinyl chloride (PVC), a polystyrene (PS), a polyvinyl acetate (PVAc), a polytetrafluoroethylene (PTFE), an acrylonitrile-butadiene-styrene (ABS) resin, an acrylic resin, a polyamide (PA), a polyacetal (POM), a polycarbonate (PC), a polyphenylene oxide (PPO), a polyethylene terephthalate (PET), a polybutylene terephthalate (PBT), and the like.

The conductive filler particles, as far as being conductive particles, are not particularly limited. Examples of the conductive filler particles include, for example, fine particles of a carbon material, a metal, and the like. Among these, one kind alone or two or more kinds in combination can be used. It is desirable that an aspect ratio (ratio of a long edge with respect to a short edge) of the conductive filler particles be within a range of 1 or more and 2 or less. When the aspect ratio is more than 2, by contact among the conductive filler particles, one-dimensional conductive paths are likely to be formed. Therefore, a desired change in electrical resistance during a deformation is unlikely to be obtained. For example, it is desirable that, as the conductive filler particles, spherical (spherical or very close to being spherical) particles be adopted, from a point of view that the packing state of the conductive filler particles in the matrix resin can be made closer to a densest packing state.

In the sensor body, in addition to the matrix resin and the conductive filler particles, various additives may also be included. Examples of the additives include, for example, an antioxidant, a plasticizer, a flexibilizer, a colorant, and the like. The sensor body can be produced, for example, by applying a sensor paint containing the matrix resin, the conductive filler particles, and the like to a surface of the base material, and then subjecting the sensor body to drying and hardening treatments. Further, the sensor body may also be produced by adding and mixing conductive filler particles to a heat-melt thermoplastic resin, and then performing shape formation on a surface of the base material. As an application method of the sensor paint, various already-known methods can be employed. In addition to the printing methods such as inkjet printing, flexo printing, gravure printing, screen printing, pad printing, lithography, and the like, examples include dip method, spray method, bar coating method, and the like.

According to the bending sensor of the fourth embodiment, the strain adjustment plate is arranged on a front surface of the base material via the adhesion layer. The material for the strain adjustment plate may be appropriately determined by taking into consideration the material of the base material and the relation between the operating temperature of the bending sensor and the glass-rubber transition region. Further, when the thickness of the strain adjustment plate is increased, the strain due to a bending deformation can be magnified. Thus, according to an assumed bending deformation, the thickness of the strain adjustment plate may be adjusted to optimize the sensor response. Further, the adhesive that constitutes the adhesion layer may also be appropriately determined by taking into consideration the materials of the base material and the strain adjustment plate, and the relation between the operating temperature of the bending sensor and the glass-rubber transition region.

In the fifth and sixth embodiments, the number of sections of the sensor body (the detection sections 710-714) is five. However, the number of detection sections is not particularly limited. It may be 10, 20, and the like. The larger the number of sections is, the more the fluctuation in the total electrical resistance can be reduced. Further, the larger the number of detection sections is, the more the density of the cracks can be increased. This also allows the fluctuation in the total electrical resistance to be reduced, and allows the sensitivity of the bending sensor to be improved.

Figure 28:
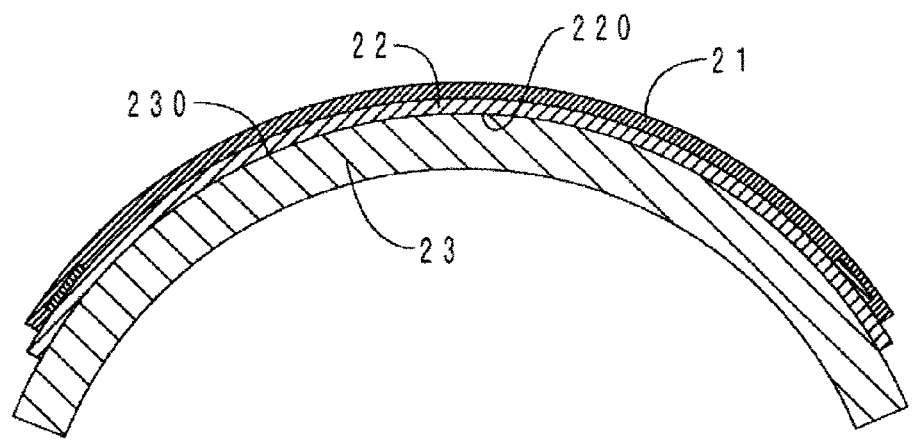
FIG. 28 is a cross sectional view of the detection section after the crack formation.

Further, in the fifth and sixth embodiments, in order to increase the density of the cracks, the width of the detection sections in the up-down direction is reduced. However, the density of the cracks may also be increased by reducing the thickness of the detection sections, that is, the thickness of the sensor body, in the front-rear direction. Further, as FIG. 28 illustrates, the density of the cracks may also be increased by reducing the radius of curvature of the mold surface 230 of the mold 23 for crack formation. By doing so, a large number of cracks can be formed. Therefore, the density of the cracks can be increased. Further, the density of the cracks may also be increased by reducing the thickness of the base material in the front-rear direction.

Embodiments

Next, the present invention is more specifically explained using embodiments.
<Responsiveness of Bending Sensor>
[Experimental Method]

Figure 12:
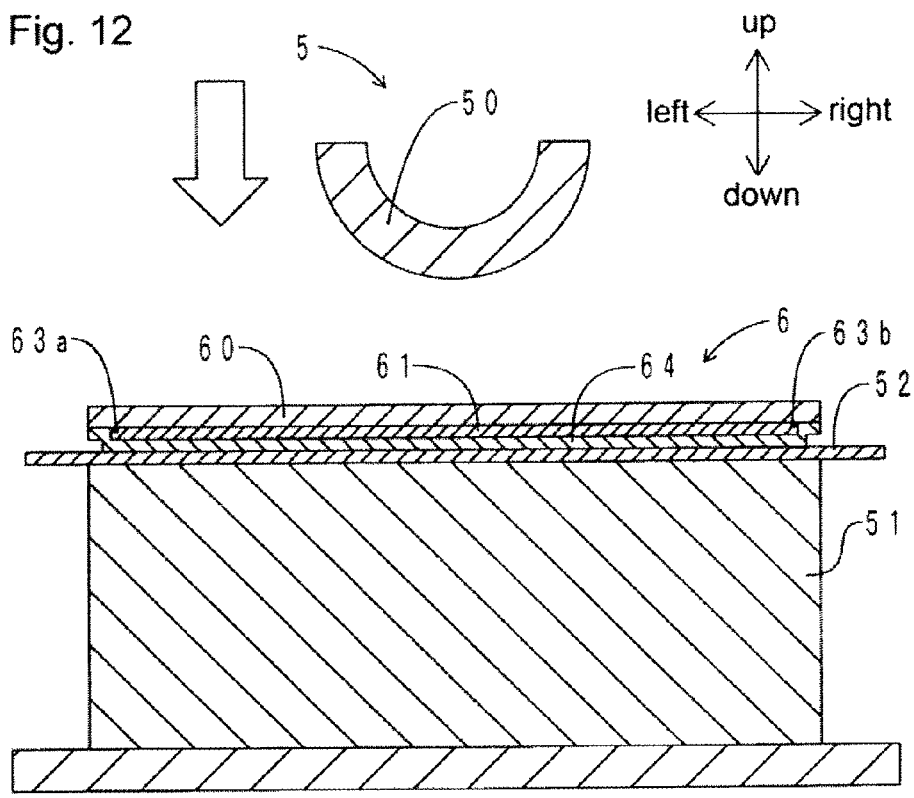
FIG. 12 is a schematic diagram of a collision experiment equipment.

A bending sensor was prepared so as to be the same as that according to the first embodiment except the arrangement of the electrodes. A collision experiment was performed with respect to this bending sensor (which may be referred to as "the sensor of the embodiment" as appropriate in the following), and responsiveness was evaluated. FIG. 12 illustrates a schematic diagram of a collision experiment equipment. As FIG. 12 illustrates, a collision experiment equipment 5 included a striker 50, an elastic body 51, and an insulation sheet 52. The elastic body 51 was made of urethane foam, and had a shape of a rectangular cuboid. The insulation sheet 52 was made of polyethylene, and was arranged on top of the elastic body 51. A bending sensor 6 included a base material 60, a sensor body 61, a pair of electrodes 63a and 63b, and a cover film 64. Configurations of the base material 60, the sensor body 61, and the cover film 64 were the same as those in the first embodiment. The electrodes 63a and 63b were respectively arranged at a left edge and a right edge of the sensor body 61. The electrodes 63a and 53b were interposed between the sensor body 61 and the base material 60. The bending sensor 6 was arranged on top of the insulation sheet 52 in a manner that the base material 60 became an upper side. The collision experiment was performed by having the striker 50, which has a shape of a half cylinder, collide from above against the bending sensor 6.

[Experimental Results]

Figure 13:
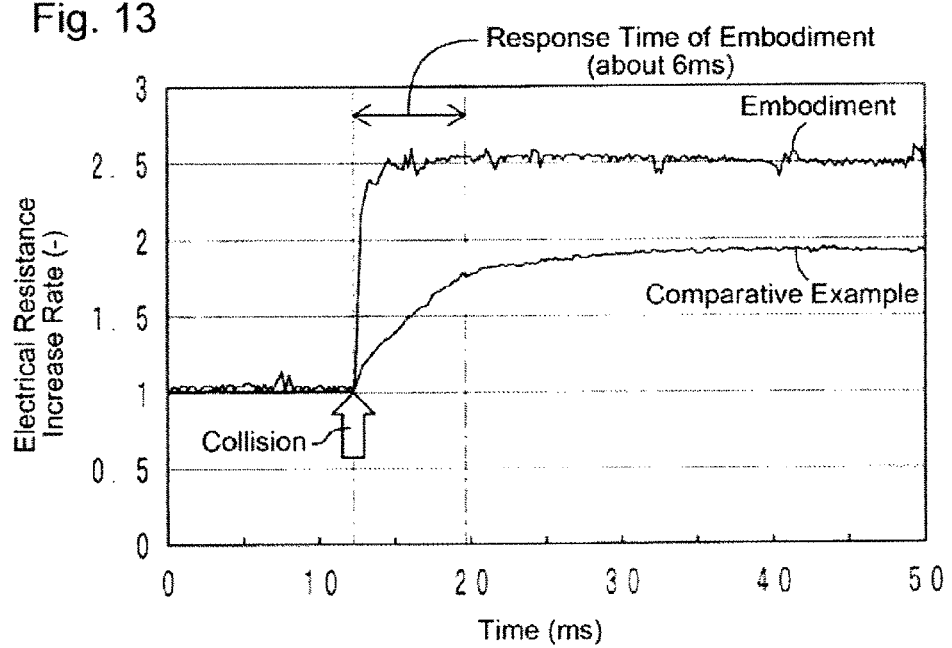
FIG. 13 is a graph illustrating time-dependent variation of a response of a sensor according to a embodiment.

FIG. 13 illustrates time-dependent variation of the response of the sensor of the embodiment (speed of the striker: 8.0 m/s). The vertical axis of FIG. 13 represents an electrical resistance increase rate, which is calculated according to the following equation (1).

$$\text{Electrical Resistance Increase Rate } (-) = \Delta R/R_0 = (R - R_0)/R_0 \qquad (1)$$

[where $R_0$ is the initial electrical resistance value before a collision; and R is the electrical resistance value after the collision]

In FIG. 13, for comparison, a result for a conventional bending sensor (referred to as "the sensor of the comparative example" in the following) is also illustrated. The sensor of the comparative example had a sensor body made from an epoxy resin and carbon beads filled in the epoxy resin. In the sensor body, cracks were not formed.

As FIG. 13 illustrates, according to the sensor of the embodiment, it was clear that the electrical resistance rose sharply immediately after a collision, and response was completed in about 6 ms after the collision. In contrast, according to the sensor of the comparative example, the rising of the electrical resistance was slow, and response was not yet completed about 6 ms after the collision. Further, the electrical resistance increase rate was also small as compared to the sensor of the embodiment.

Figure 14:
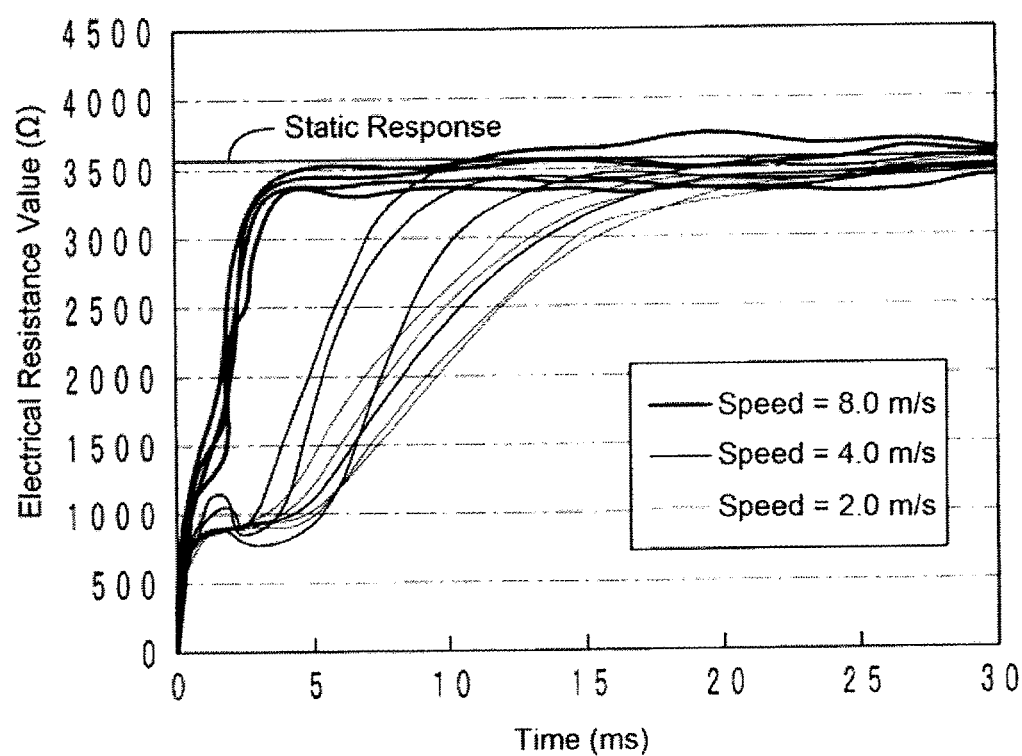
FIG. 14 is a graph illustrating time-dependent variation of a response of a sensor according to a embodiment, when speed of a striker is varied.

Further, FIG. 14 illustrates time-dependent variation of response of the sensor of the embodiment, when the speed of the striker is varied. Three kinds of the speed of the striker including 8.0 m/s, 4.0 m/s, and 2.0 m/s were adopted. In FIG. 14, data sets for speed=8.0 m/s, speed=4.0 m/s, and speed=2.0 m/s are respectively illustrated with thick lines, medium thick lines, and thin lines. For each of the speeds, measurements were performed four times. In FIG. 14, the static response means a maximum value of the electrical resistance, which is obtained when the bending sensor 6 is slowly pressed from above with the striker 50 and the deformation is maintained.

As FIG. 14 illustrates, according to the sensor of the embodiment, a certain electrical resistance value was shown, which corresponded to the shape of the striker regardless of the speed of the striker, that is, the input speed of a strain. From the above, it was confirmed that the bending sensor according to the present invention, was less dependent on the input speed of a strain.

<Linearity of Sensor Response>
[Experimental Method]

With respect to the sensor of the above embodiment, bending experiments were performed by varying a strain amount input to the sensor body in advance (referred to as a "pre-strain amount" in the following). The pre-strain amount was adjusted by varying a curvature of an inner peripheral surface of a mold used in the bending-hardening process. Here, the pre-strain amount $\epsilon_{pre}$ is calculated according to the following equation (2).

$$\epsilon_{pre} (\%) = Ls/Lc \times 100 \qquad (2)$$

[where Ls is a longitudinal length of an outmost surface of the sensor body during bending-hardening; and Lc is a longitudinal length (a constant) of a thickness-wise center plane of the base material]

The bending experiments were performed by pasting a plurality of test specimens (sensor body and base material), each of which had a different pre-strain amount in a sensor body, to a bending member, which was then bent toward a direction opposite to the bending direction during the pre-strain input. Four kinds of the pre-strain amounts of the test specimens were adopted including 0%, 0.5%, 0.7%, and 0.9%. The thickness of the base material was 0.5 mm. A strain amount $\epsilon_{bend}$, which was input during a bending deformation, was calculated according to the following equation (3).

$$\epsilon_{bend}(\%)=(L-L_0)/L_0 \times 100 = t/r \tag{3}$$

[where L is a longitudinal length of an outmost surface of a sensor body during a bending deformation; $L_0$ is the longitudinal length of the outmost surface of the sensor body in an initial state (before the bending deformation); t is a thickness of a test specimen; and r is a radius of curvature of the test specimen]

[Experimental Results]

Figure 15:
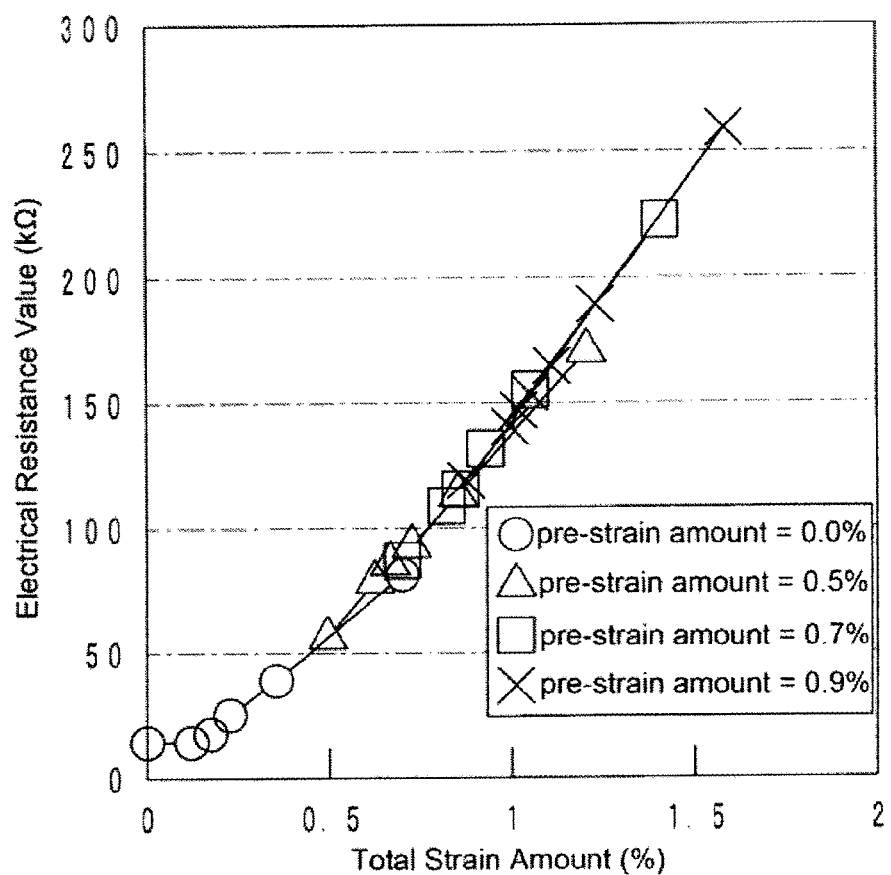
FIG. 15 is a graph illustrating variation of electrical resistance with respect to a total strain amount, measured for each of test specimens.

FIG. 15 illustrates variation of the electrical resistance with respect to a total strain amount, measured from each of the test specimens. The total strain amount is a value obtained by adding a strain amount during a bending experiment to a pre-strain amount ($\epsilon_{pre}+\epsilon_{bend}$). As FIG. 15 illustrates, as the pre-strain amount increases, the total strain amount increases. Along with this, the electrical resistance also increases. From the above, it was confirmed that a predetermined strain amount was input by heat-hardening the coated film of the sensor paint in a curved state.

Figure 16:
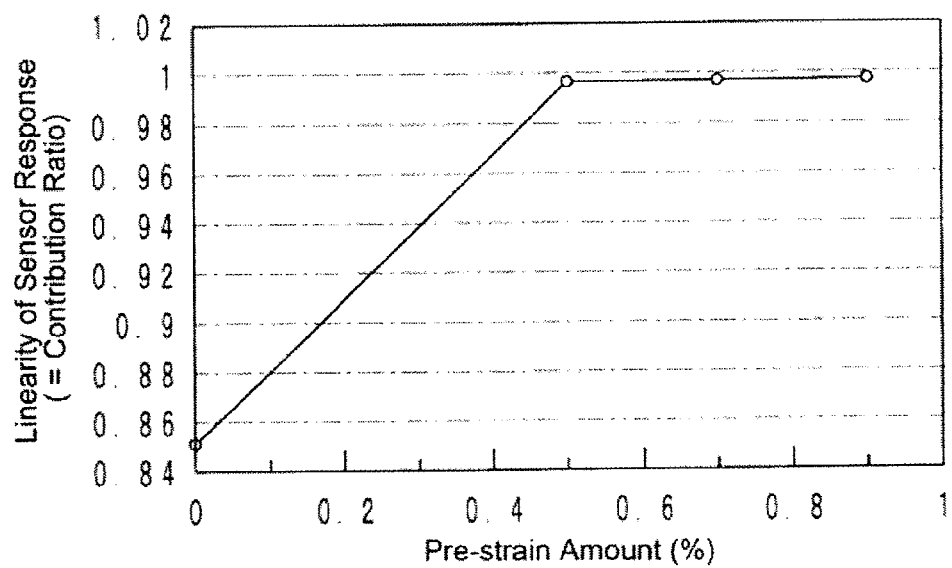
FIG. 16 is a graph illustrating a contribution ratio with respect to a pre-strain amount.

Further, for each of the test specimens, an electrical resistance increase rate ($\Delta R/R_0$, where $R_0$ is an initial electrical resistance value before a bending deformation; and R is an electrical resistance value during a bending deformation) with respect to a curvature (1/r) during a bending deformation was plotted. Then, a contribution ratio (a square of a correlation coefficient) was obtained by using a linear expression to approximate a relation between the curvature and the electrical resistance increase rate. FIG. 16 illustrates the contribution ratio with respect to the pre-strain amount.

As FIG. 16 illustrates, in the case where the pre-strain amount was 0.5%, 0.7%, and 0.9%, the contribution ratio was very close to 1. Specifically, in contrast to that the contribution ratio was 0.8523 for the case where the pre-strain amount was 0%, the contribution ratio was 0.9975 for the case where the pre-strain amount was 0.5%, 0.998 for the case where the pre-strain amount was 0.7%, and 0.99845 for the case where the pre-strain amount was 0.9%. That is, for the case where the pre-strain amount was 0.5%, 0.7%, and 0.9%, the relation between the curvature and the electrical resistance was nearly linear. Thus, by inputting a predetermined strain in advance to the sensor body, the detection region of the bending sensor can be shifted to a region where the relation between a bending deformation and the sensor response is linear.

<Strain Magnifying Effect by Strain Adjustment Plate>

Figure 24:
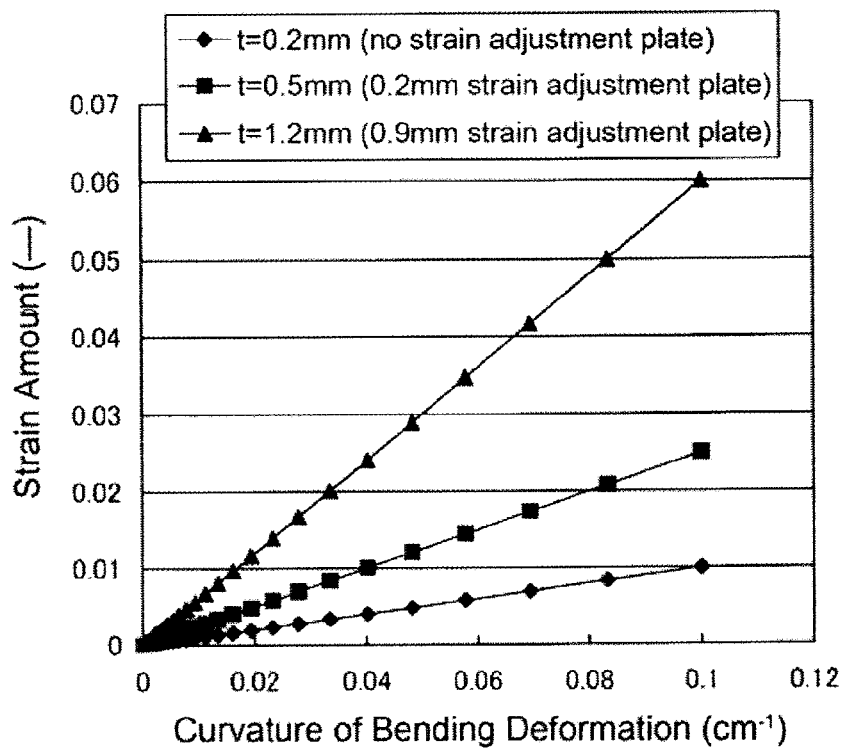
FIG. 24 is a graph illustrating measurement results of a strain amount with respect to a bending deformation.

A bending sensor having the same configuration as that in the fourth embodiment, except that there was not a cover film, was prepared. The thickness of the strain adjustment plate was varied and a strain amount with respect to a bending deformation was measured. In the bending sensor, the sensor body had a thickness of about 80 μm; the base material had a thickness of about 120 μm; and the adhesion layer had a thickness of about 100 μm. The strain adjustment plate had two kinds of thickness including 200 μm and 900 μm. FIG. 24 illustrates measurement results of the strain amount with respect to the bending deformation. In FIG. 24, for comparison, measurement results for a bending sensor without a strain adjustment plate and an adhesion layer (base material and sensor body) are also illustrated. In the present measurement, a thickness-wise middle plane of a bending sensor was used as a neutral plane of a bending deformation. Therefore, the strain amount represented by the vertical axis of FIG. 24 is calculated according to the following equation (4).

$$\text{Strain amount} = (L-L_0)/L_0 = \{(r+t/2)\theta - r\theta\}/r\theta = t/2r \tag{4}$$

[where L is a longitudinal length of an outmost surface of a bending sensor during a bending deformation; $L_0$ is the longitudinal length of the outmost surface of the bending sensor in an initial state (before the bending deformation); t is a thickness of the bending sensor; and r is a radius of curvature extending from a center of curvature to a central axis of the bending deformation]

As FIG. 24 illustrates, the bending sensors having a strain adjustment plate arranged therein had increased strain amounts as compared to the bending sensor without a strain adjustment plate. Further, the thicker the strain adjustment plate, the larger the strain amount became. As just described, when a strain adjustment plate was arranged, the strain due to a bending deformation can be magnified. Further, by increasing the thickness of the strain adjustment plate, the strain amount can be increased.

<Influence on Sensor Response according to Type of Adhesion Layer>

Figure 25:
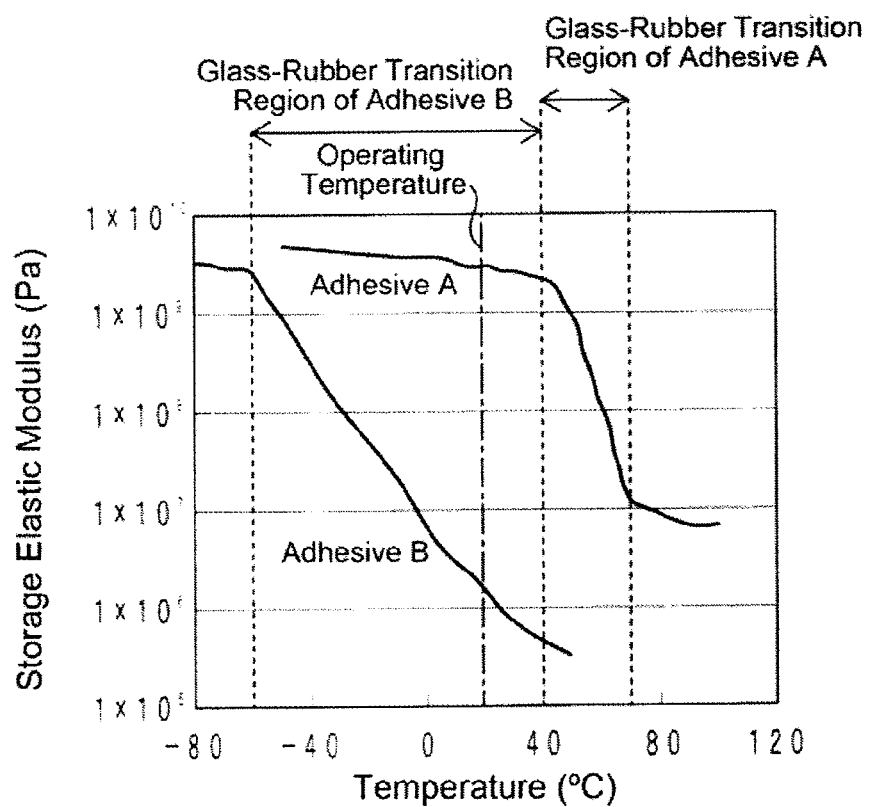
FIG. 25 is a graph illustrating glass-rubber transition regions of adhesives used in a embodiment.

Bending sensors having the same configuration as that in the fourth embodiment were prepared by varying the adhesion layer, and the responsiveness thereof was evaluated. The evaluation of the responsiveness was performed at a temperature of about 20° C. Two types of adhesives having different glass-rubber transition regions were used for the adhesion layer. FIG. 25 illustrates the glass-rubber transition regions of the adhesives used.

As FIG. 25 illustrates, an adhesive A has a glass-rubber transition region of 40 to 70° C., which is on a higher temperature side than 30° C. (operating temperature+10° C.). On the other hand, an adhesive B has a glass-rubber transition region of −60 to 40° C., which includes a range of the operating temperature 20° C.±10° C. Both the base material and the strain adjustment plate have a glass-rubber transition region on the higher temperature side than 30° C.

Figure 26:
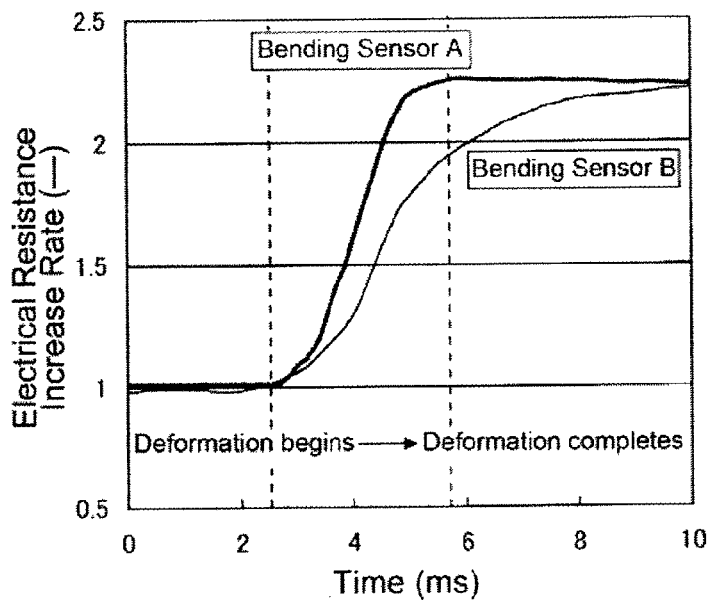
FIG. 26 is a graph illustrating time-dependent variations of sensor responses in bending sensors having different adhesion layers.
Figure 27:
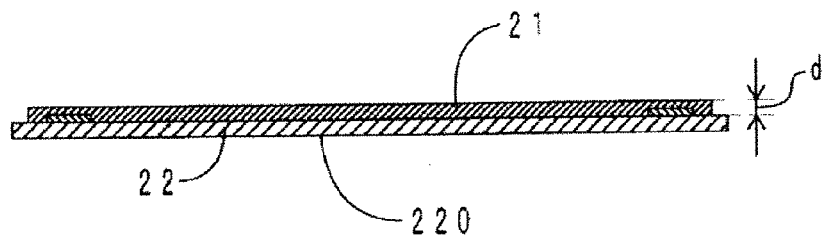
FIG. 27 is a cross sectional view of a detection section before crack formation.

Collision experiments, which were the same as the one described above, were performed with respect to the two bending sensors, which respectively used the two types of adhesives, and the responsiveness was evaluated (see FIG. 12 mentioned earlier). In the following, the two bending sensors are respectively referred to as a bending sensor A and a bending sensor B according on the type of an adhesive used. The bending sensors A and B each were arranged on top of the insulation sheet in a manner that the strain adjustment plate was the upper side. The striker speed was set to 8.0 m/s. FIG. 26 illustrates time-dependent variations of the sensor responses. The vertical axis of FIG. 26 represents the electrical resistance increase rate calculated according to the equation (1) mentioned earlier.

As FIG. 26 illustrates, with respect to the bending sensor A, when a bending deformation due to an impact by the striker began, the electrical resistance rapidly increased. When the bending deformation completed, the increase in the electrical resistance also stopped. Thereafter, the value of the electrical resistance when the bending deformation completed was retained. On the other hand, with respect to the sensor B, when a bending deformation began, the electrical resistance gradually increased. Even when the bending deformation has completed, the electrical resistance continued to increase, and reached an expected electrical resistance value in about 4 ms after the bending deformation completed. For the bending sensor B, the adhesive B, which had a glass-rubber transition region overlapping the operating temperature range, was used. Therefore, it is believed that the bending deformation, which was transmitted via the strain adjustment plate, was relaxed by the adhesion layer. Thus, in the bending sensor B, the bending deformation was not promptly transmitted to the sensor body so that a response delay occurred.

<Electrical Resistance Measurement Simulation>

[Samples]

Samples of embodiments 1-3 were bending sensors in which detection sections were connected in parallel, similar to the bending sensor according to the fifth embodiment (see FIG. 29). Samples of embodiments 4-6 were bending sensors in which detection sections were connected in series, similar to the bending sensor according to the sixth embodiment (see FIG. 31). A sample of a reference example 1 was a bending sensor having a single detection section, similar to the bending sensor used in the previous collision experiment (see FIG. 12). Each of the samples of the embodiments 1-6 and the reference example 1 had the same total area of detection sections. Further, unless otherwise specified in the following, constituting components of each of the samples had the same arrangement, shape, and material properties. In the following, configurations of the samples are each explained with reference to FIGS. 12, and 29-31.

(1) Embodiment 1

The sample of the embodiment 1 had the same configuration as that of the bending sensor according to the fifth embodiment. Further, the detection sections 710-714 each had a width of 1 mm in a transverse0 direction and a total length of 50 mm in a longitudinal direction.

(2) Embodiment 2

The embodiment 2 was different from the embodiment 1 in that the number of arranged detection sections 710-714 was not 5, but 10, and in that the width in the transverse direction of each of the detection sections 710-714 was not 1 mm, but 0.5 mm. Other aspects were the same.

(3) Embodiment 3

The embodiment 3 was different from the embodiment 1 in that the number of arranged detection sections 710-714 was not 5, but 20, and in that the width in the transverse direction of each of the detection sections 710-714 was not 1 mm, but 0.25 mm. Other aspects were the same.

(4) Embodiment 4

The sample of the embodiment 4 had the same configuration as that of the bending sensor according to the sixth embodiment. Further, the detection sections 710-714 each had a width of 1 mm in the transverse direction and a total length of 50 mm in the longitudinal direction.

(5) Embodiment 5

The embodiment 5 was different from the embodiment 4 in that the number of arranged detection sections 710-714 was not 5, but 10, and in that the width in the transverse direction of each of the detection sections 710-714 was not 1 mm, but 0.5 mm. Other aspects were the same.

(6) Embodiment 6

The embodiment 6 was different from the embodiment 4 in that the number of arranged detection sections 710-714 was not 5, but 20, and in that the width in the transverse direction of each of the detection sections 710-714 was not 1 mm, but 0.25 mm. Other aspects were the same.

(7) Reference Example 1

The sample of the reference example 1 had the same configuration as that of the bending sensor 6 illustrated in FIG. 12. That is, for the reference example 1, the single detection section (sensor body) 61 was arranged. The detection section 61 had a width of 5 mm in the transverse direction.

[Simulation Method]

Electrical resistance measurement simulation was performed for each of the samples using a Monte Carlo method. Fluctuation (fluctuation in ±directions when an average value is set to 100%) in each of the single detection sections 710-714 and 61 was assumed to be uniformly distributed within a range of +33.3%, and an average value, a standard deviation, a maximum value, and a minimum value of the total electrical resistance including the fluctuation were obtained for each of the samples based on 2,000 trials.

[Simulation Results]

Table 1 illustrates results of the simulation.

TABLE 1

|  | Reference example 1 | Embodiment 1 | Embodiment 2 | Embodiment 3 | Embodiment 4 | Embodiment 5 | Embodiment 6 |
|---|---|---|---|---|---|---|---|
|  |  | Connection method of the detection sections | | | | | |
|  |  | Parallel connection | | | Serial connection | | |
| Average value (%) | 99.9 | 97.1 | 96.5 | 96.3 | 2501 | 10001 | 40082 |
| Maximum value (%) | 133.3 | 126.4 | 119.5 | 109.8 | 3222 | 11839 | 45074 |
| Minimum value (%) | 66.7 | 74.1 | 79.5 | 83.6 | 1828 | 8097 | 33802 |
| Range (%) | 66.6 | 52.3 | 40.0 | 26.3 | 1394 | 3743 | 11272 |
| Fluctuation (%) | ±33.3 | ±27 | ±20.7 | ±13.6 | ±28 | ±19 | ±14 |
| Standard deviation | 19.5 | 8.8 | 6.3 | 4.4 | 210 | 593 | 1695 |
| Variation coefficient | 19.5 | 9.0 | 6.5 | 4.5 | 8.4 | 5.9 | 4.2 |

Figure 32:
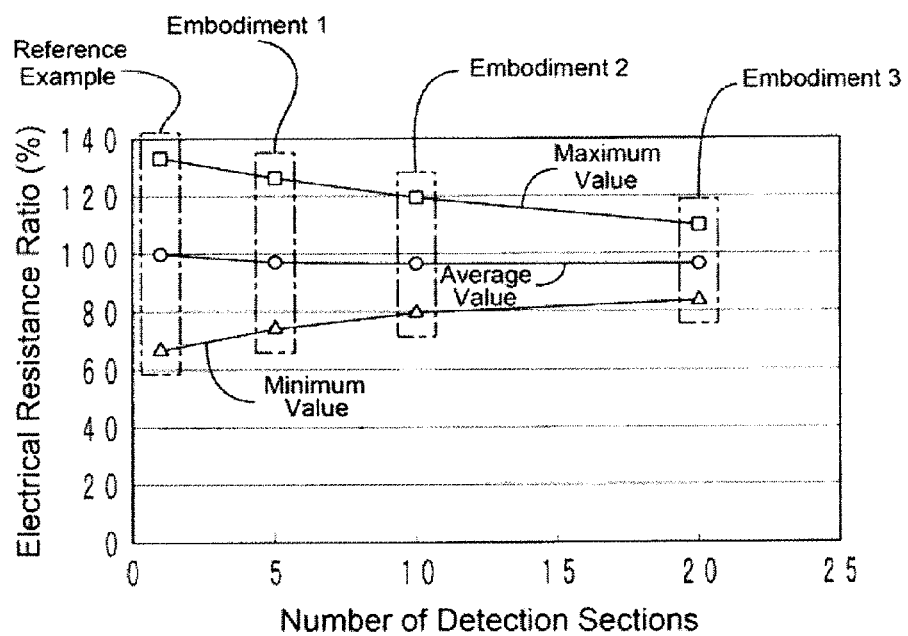
FIG. 32 is a graph illustrating a relation between a number of detection sections and an electrical resistance ratio in a case where detection sections are connected in parallel.
Figure 33:
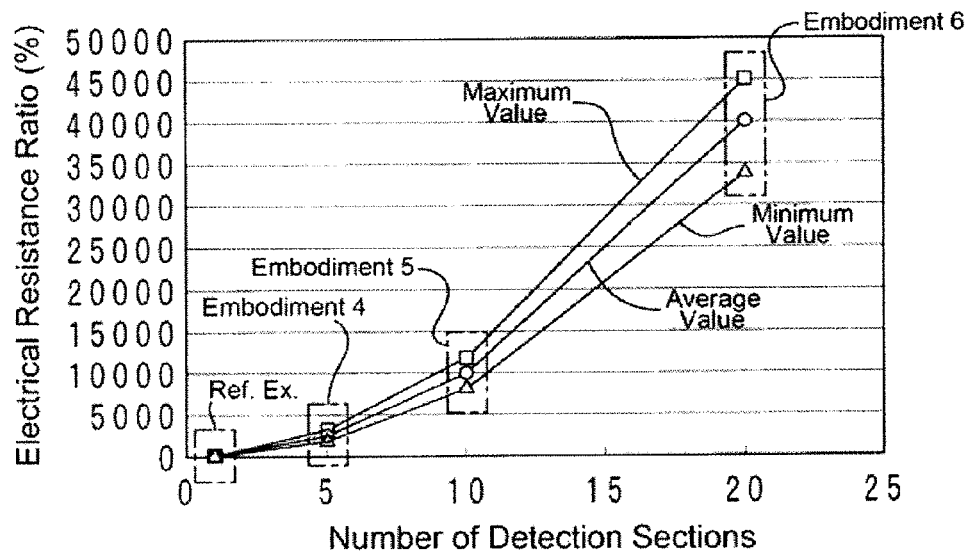
FIG. 33 is a graph illustrating a relation between a number of detection sections and an electrical resistance ratio in a case where detection sections are connected in series.
Figure 34:
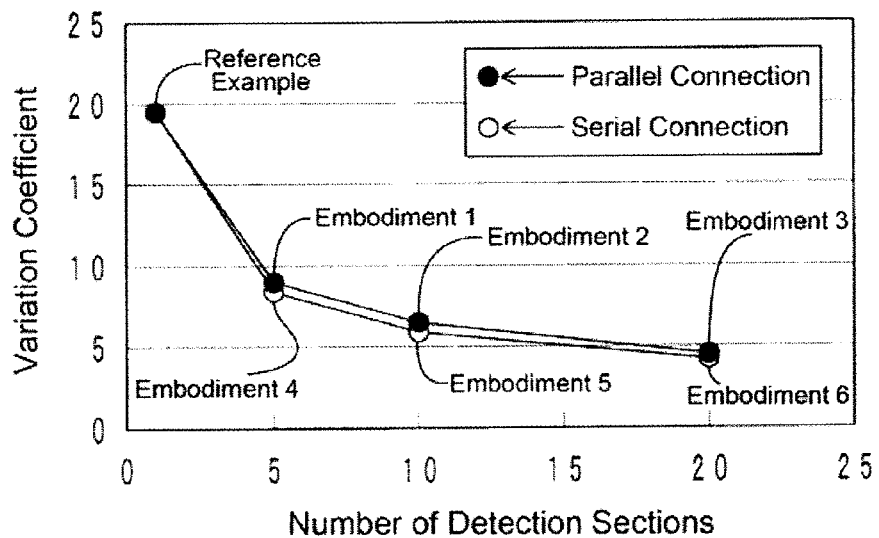
FIG. 34 is a graph illustrating relations between a number of detection sections and a variation coefficient in a case where detection sections are connected in parallel and a case where detection sections are connected in series.

In Table 1, the range represents Maximum Value subtracted by Minimum Value. The variation coefficient is Standard Deviation divided by Average Value. FIG. 32 is a graph illustrating a relation between the number of detection sections and an electrical resistance ratio for the case where the detection sections are connected in parallel. FIG. 33 is a graph illustrating a relation between the number of detection sections and the electrical resistance ratio for the case where the detection sections are connected in series. FIG. 34 is a graph illustrating relations between the number of detection sections and the variation coefficient for the case where the detection sections are connected in parallel and the case where the detection sections are connected in series. The average value, the maximum value, and the minimum value in Table 1 and FIGS. 32 and 33 are the electrical resistance ratio (relative value) when the average value of the electrical resistance of each single detection section is 100%.

As Table 1 and FIG. 32 illustrate, in the case of the parallel connection, along with the increase of the number of detection sections, the range and the fluctuation decreased. The average value was nearly a constant. As Table 1 and FIG. 33 illustrate, in the case of the serial connection, along with the increase of the number of detection sections, the electrical resistance ratio increased. Therefore, the range also increased. However, the fluctuation decreased. As Table 1 and FIG. 34 illustrate, in the case of the parallel connection, along with the increase of the number of detection sections, the variation coefficient decreased. Similarly, in the case of the serial connection, along with the increase of the number of detection sections, the variation coefficient decreased. That is, in both the case of the parallel connection and the case of the serial connection, along with the increase of the number of detection sections, the relative fluctuation decreased.

INDUSTRIAL APPLICABILITY

The bending sensor and the deformed shape measurement method according to the present invention are useful as a transition estimator of a deformed shape during a collision in various kinds of collision tests, in addition to vehicle collision detection.

What is claimed is:

1. A bending sensor comprising:
   a base material;
   a sensor body arranged on a surface of the base material and containing a matrix resin and conductive filler particles, the conductive filler particles being 30% by volume or more of the matrix resin, and in which three-dimensional conductive paths are defined by contact among the conductive filler particles and when a deformation amount of the sensor body increases, an electrical resistance increases;
   an elastically deformable cover film arranged so as to cover the sensor body;
   a strain adjustment plate arranged on a rear surface of the base material;
   an adhesion layer bonding the strain adjustment plate and the base material; and
   a plurality of electrodes connected to the sensor body and capable of outputting electrical resistances, wherein
   cracks are provided in the sensor body along such a direction that the conductive paths are cut off during a bending deformation of the sensor body, the cracks being pre-formed on the sensor body by a deformation of a precursor of the sensor body along a mold surface of a mold for crack formation, and
   the base material, the strain adjustment plate, and the adhesion layer are all made from materials having a glass-rubber transition region, in which a storage elastic modulus transitions, on one of a lower temperature side than a lower temperature limit of an operating temperature range of the bending sensor minus 10° C., or on a higher temperature side than an upper temperature limit of the operating temperature range of the bending sensor plus 10° C., and a pre-determined strain is provided in a bending direction in the sensor body.

2. The bending sensor according to claim 1, wherein the conductive filler particles have an average particle size of 0.05 µm or more and 100 µm or less.

3. The bending sensor according to claim 1, wherein the conductive filler particles are spherical carbon particles.

4. The bending sensor according to claim 1, wherein, when a plurality of unit sections each having a length of 2 mm or less are partitioned in the sensor body in a direction along which the electrodes are arranged, at least one crack is provided in each of the unit sections.

5. The bending sensor according to claim 1, wherein the plurality of the electrodes are a printed conductive paint on the base material.

6. The bending sensor according to claim 5, wherein the electrodes have such a surface shape that an edge line in a direction along which the sensor body extends has a curved portion.

7. The bending sensor according to claim 1 further comprising wirings respectively connected to the electrodes, the wirings being an etched metal foil.

8. The bending sensor according to claim 1, wherein, between two of the electrodes, the sensor body has a plurality of detection sections lined up in a perpendicular direction, each of the detection sections extending in a juxtaposing direction, the juxtaposing direction being a direction along which the two electrodes line up, and the perpendicular direction being a direction perpendicular to the juxtaposing direction.

9. The bending sensor according to claim 8, wherein, between neighboring two of the electrodes, the detection sections are mutually electrically connected in parallel.

10. The bending sensor according to claim 8, wherein, between neighboring two of the electrodes, the detection sections are mutually electrically connected in series.

11. The bending sensor according to claim 8, wherein at least five of the detection sections are arranged.

12. A deformed shape measurement method comprising:
   a detection process detecting a bending deformation of the bending sensor according to claim 1 for each of a plurality of measurement sections partitioned by the electrodes;
   a partial shape calculation process calculating deformed shapes of the measurement sections based on detected deformation data of the measurement sections; and
   an entire shape calculation process calculating an entire deformed shape of the bending sensor by joining together the calculated deformed shapes of the measurement sections.

* * * * *